US008849817B1

(12) United States Patent
Mysen et al.

(10) Patent No.: US 8,849,817 B1
(45) Date of Patent: *Sep. 30, 2014

(54) RANKING CUSTOM SEARCH RESULTS

(75) Inventors: Clarence Christopher Mysen, Santa Clara, CA (US); Naval Verma, Sunnyvale, CA (US); Johnny Chen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/174,442

(22) Filed: Jun. 30, 2011

Related U.S. Application Data

(62) Division of application No. 11/618,321, filed on Dec. 29, 2006, now Pat. No. 7,987,185.

(51) Int. Cl.
*G06F 17/30* (2006.01)
(52) U.S. Cl.
USPC .......................................... 707/732
(58) Field of Classification Search
USPC .......................................... 707/732
See application file for complete search history.

(56) References Cited

U.S. PATENT DOCUMENTS

| | | | |
|---|---|---|---|
| 5,752,242 A | 5/1998 | Havens | |
| 6,285,999 B1 | 9/2001 | Page | |
| 6,366,923 B1 | 4/2002 | Lenk et al. | |
| 6,493,703 B1 * | 12/2002 | Knight et al. | 1/1 |
| 6,499,029 B1 | 12/2002 | Kurapati et al. | |
| 6,675,159 B1 | 1/2004 | Lin et al. | |
| 6,701,314 B1 | 3/2004 | Conover et al. | |
| 6,757,662 B1 | 6/2004 | Greenwald et al. | |
| 6,944,609 B2 | 9/2005 | Witbrock | |
| 6,947,924 B2 * | 9/2005 | Bates et al. | 707/708 |
| 7,181,459 B2 | 2/2007 | Grant et al. | |
| 7,185,001 B1 | 2/2007 | Burdick et al. | |
| 7,203,675 B1 | 4/2007 | Papierniak et al. | |
| 7,266,563 B2 | 9/2007 | Morris et al. | |
| 7,346,604 B1 * | 3/2008 | Bharat et al. | 1/1 |
| 7,415,460 B1 | 8/2008 | Phillips et al. | |
| 7,543,005 B1 * | 6/2009 | Edelman et al. | 1/1 |

(Continued)

FOREIGN PATENT DOCUMENTS

| | | |
|---|---|---|
| JP | 2001-067262 | 3/2001 |
| JP | 2001-147922 | 5/2001 |

(Continued)

OTHER PUBLICATIONS

HTML 4.01 Specification, W3C Recommendation Dec. 24, 1999.*

(Continued)

*Primary Examiner* — Ajay Bhatia
*Assistant Examiner* — Kurt Mueller
(74) *Attorney, Agent, or Firm* — Fish & Richardson P.C.

(57) ABSTRACT

A system searches a first search index based on a search query to obtain first search results and searches a second search index based on the search query to obtain second search results. The system further ranks the first search results using a first ranking algorithm and one or more first ranking parameters to produce ranked first search results, and ranks the second search results using a second ranking algorithm and one or more second ranking parameters to produce second search results, where the one or more first ranking parameters are different than the one or more second ranking parameters and where the one or more second ranking parameters include at least one of previous user feedback associated with custom content that corresponds to the second search index, annotations of the custom content provided by a user, or usage patterns associated with users previously accessing and searching the custom content. The system also provides the ranked first and second search results to a user.

30 Claims, 17 Drawing Sheets

(56) References Cited

U.S. PATENT DOCUMENTS

| | | | |
|---|---|---|---|
| 7,647,339 B2 | 1/2010 | Gonzalez | |
| 7,672,952 B2* | 3/2010 | Isaacson et al. | 707/999.01 |
| 7,725,453 B1* | 5/2010 | Chen et al. | 707/711 |
| 7,809,709 B1* | 10/2010 | Harrison, Jr. | 707/707 |
| 2001/0005831 A1 | 6/2001 | Lewin et al. | |
| 2001/0039563 A1 | 11/2001 | Tian | |
| 2002/0016800 A1 | 2/2002 | Spivak et al. | |
| 2002/0059297 A1 | 5/2002 | Schirmer et al. | |
| 2002/0073115 A1 | 6/2002 | Davis | |
| 2002/0078045 A1 | 6/2002 | Dutta | |
| 2002/0083039 A1 | 6/2002 | Ferrari et al. | |
| 2002/0124004 A1 | 9/2002 | Reed et al. | |
| 2002/0138331 A1 | 9/2002 | Hosea et al. | |
| 2002/0165856 A1* | 11/2002 | Gilfillan et al. | 707/3 |
| 2003/0033279 A1 | 2/2003 | Gibson et al. | |
| 2003/0212648 A1 | 11/2003 | Cunningham et al. | |
| 2004/0030692 A1 | 2/2004 | Leitermann | |
| 2004/0088313 A1 | 5/2004 | Torres | |
| 2004/0093321 A1 | 5/2004 | Roustant et al. | |
| 2004/0143569 A1 | 7/2004 | Gross et al. | |
| 2004/0143573 A1 | 7/2004 | Burkey et al. | |
| 2004/0143659 A1 | 7/2004 | Milliken et al. | |
| 2004/0148275 A1 | 7/2004 | Achlioptas | |
| 2004/0194141 A1 | 9/2004 | Sanders | |
| 2004/0250205 A1 | 12/2004 | Conning | |
| 2005/0071328 A1 | 3/2005 | Lawrence | |
| 2005/0076003 A1 | 4/2005 | DuBose et al. | |
| 2005/0076019 A1 | 4/2005 | Jackson et al. | |
| 2005/0114324 A1 | 5/2005 | Mayer | |
| 2005/0149502 A1 | 7/2005 | McSherry | |
| 2005/0192946 A1* | 9/2005 | Lu et al. | 707/3 |
| 2005/0198068 A1 | 9/2005 | Mukherjee et al. | |
| 2005/0216304 A1 | 9/2005 | Westphal | |
| 2005/0234895 A1* | 10/2005 | Kramer | 707/3 |
| 2005/0240393 A1 | 10/2005 | Glosson | |
| 2005/0261994 A1* | 11/2005 | Lawe | 705/30 |
| 2006/0047643 A1 | 3/2006 | Chaman | |
| 2006/0218146 A1 | 9/2006 | Bitan et al. | |
| 2006/0265477 A1 | 11/2006 | Bartholomew | |
| 2007/0043723 A1 | 2/2007 | Bitan et al. | |
| 2007/0083505 A1 | 4/2007 | Ferrari et al. | |
| 2007/0088680 A1 | 4/2007 | Sauve et al. | |
| 2007/0100862 A1 | 5/2007 | Reddy et al. | |
| 2007/0100898 A1 | 5/2007 | Petras et al. | |
| 2007/0106651 A1* | 5/2007 | Isaacson et al. | 707/3 |
| 2007/0106659 A1* | 5/2007 | Lu et al. | 707/5 |
| 2007/0112759 A1 | 5/2007 | Kulakow et al. | |
| 2007/0168331 A1 | 7/2007 | Reddy et al. | |
| 2007/0185844 A1 | 8/2007 | Schachter | |
| 2007/0233672 A1 | 10/2007 | Sanfacon et al. | |
| 2008/0065237 A1 | 3/2008 | Long | |
| 2008/0288509 A1* | 11/2008 | Mysen et al. | 707/100 |
| 2010/0114925 A1* | 5/2010 | Shafer et al. | 707/759 |

FOREIGN PATENT DOCUMENTS

| | | |
|---|---|---|
| JP | 2001-188760 | 7/2001 |
| JP | 2001-326921 | 11/2001 |
| JP | 2003-514282 | 4/2003 |
| JP | 2003-296341 | 10/2003 |
| JP | 2003-296350 | 10/2003 |
| JP | 2004-078618 | 3/2004 |
| JP | 2004-506955 | 3/2004 |
| JP | 2004-341960 | 12/2004 |
| JP | 2005-202788 | 7/2005 |
| JP | 2005-242586 | 9/2005 |
| JP | 2005-251115 | 9/2005 |

OTHER PUBLICATIONS

William Janssen & Kris Popat, UpLib: A Universal Personal Digital Library System, Nov. 22, 2003, ACM Symposium on Document Engineering.*

William C. Janssen, Collaborative Extensions for the UpLib System, Jun. 9, 2004, Proceedings of the Fourth ACM/IEEE Joint Conference on Digital Libraries.*

Co-pending U.S. Appl. No. 11/618,321, filed Dec. 29, 2006 entitled "Ranking Custom Search Results" by Clarence Christopher MYSEN et al., 54 pages.

Co-pending U.S. Appl. No. 11/618,461, filed Dec. 29, 2006 entitled "Custom Search" by Clarence Christopher Mysen et al., 63 pages.

Co-pending U.S. Appl. No. 11/618,463, filed Dec. 29, 2006 entitled "Custom Content Provisioning" by Clarence Christopher Mysen et al., 64 pages.

Co-pending U.S. Appl. No. 12/209,996, filed Sep. 12, 2008 entitled "Custom Search Index Data Security" by Johnny Chen et al., 74 pages.

Co-pending U.S. Appl. No. 11/618,391, filed Dec. 29, 2006 entitled "Custom Content and Advertising" by Clarence Christopher Mysen et al., 38 pages.

"Yahoo Search Subscriptions Brings Premium Content Into Web Search" Blog, http://blog.searchenginewatch.com/blog/050616-000001, pp. 1-3, posted Jun. 15, 2005.

"Epicurious.com Website" (printed 2006), available at http://www.epicurious.com.

"Google Froogle Website" (printed 2006), available at http://froogle.google.com/froogle?q=hat&btnG=Search+Froogle.

"Google Images Website" (printed 2006), available at http://images.google.com/images?q=dog&hl=en&binG=Search+Images.

"Google Scholar Website" (printed 2006), available at http://scholar.google.com/scholar?q=tcp%2Fip&hl=en&lr=&btnG=Search.

"Google Website" (printed 2006), available at http://www.google.com/search?hl=en&q=russian+book&btnG=Google+Search.

"Monster.com Website" (printed 2006), available at http://www.monster.com.

"Program of the Sym, Symposium Proceedings", Humboldt-Universität [online] 2005 [Retrieved on Oct. 3, 2005] Retrieved from the Internet: <URL: http://www.lirmm.fr~bella/XSym/program.htm>.

"Realtor.com Website" (printed 2006), available at http://www.realtor.com/Default.asp?poe=realtor.

"Welcome to Flickr—Photo Sharing" [online] 2005 [Retrieved on Oct. 3, 2005] Retrieved from the Internet: <URL: http://www.flickr.com>.

"Yahoo Website" (printed 2006), available at http://search.yahoo.com/search?p=nursing+jobs&fr=yfp-t-500&toggle=1&cop=&ei=UTF-8.

AIIM E-Doc Magazine—Enterprise Content Management at Work!, "Going Native, When Should You Use a Native XML Database?" [online] Nov./Dec. 2002 [Retrieved on Oct. 3, 2005] Retrieved from the Internet: <URL: http://www.edocmagazine.com/columns_articles.asp?ID=25421&vault=CFOCUS&Header=e_all_columns_header.gif>.

Canadian Office Action for Canadian Application No. 2626856, dated Jan. 9, 2012, 2 pages.

Chinese Office Action issued in Chinese Application No. 201010156907.6 dated Apr. 27, 2012, with English Translation, 14 pages.

Ebay, "How Can I find What I Want to Buy?" [online] 2005 [Retrieved on Oct. 3, 2005] Retrieved from the Internet: <URL: http://pages.ebay.com/help/find/questions/find-items.html>.

Ebay, "Keyword Search Category Expansions" [online] 2005 [Retrieved on Oct. 3, 2005] Retrieved from the Internet: <URL: http://pages.ebay.com/help/find/search-expansions.html>.

European Search Report for Application No. 05849843.7 dated Mar. 30, 2009, 5 pages.

International Search Report and Written Opinion, PCT/US05/45447, Jul. 21, 2007, 12 pages.

IXIASOFT, Inc. "TEXTML Server for Technical Documentation", 9 Pages.

IXIASOFT, Inc. "XML Database, XML Search Engine, XML Content Management—IXIASOFT", [online] [Retrieved on Oct. 3, 2005] Retrieved from the Internet: <URL:http://www.ixiasoft.com>.

Japanese Notice of Allowance issued in JP 2008-537679 on Sep. 24, 2011, 3 pages.

(56) References Cited

OTHER PUBLICATIONS

Japanese Office Action issued in JP 2008-537678 on Dec. 20, 2010, 14 pages with English Translation.
Japanese Office Action issued in JP 2008-537678 on Jul. 26, 2011, 7 pages with English Translation.
Korean Office Action issued in Korean Application No. 2008-7012450 on Jul. 31, 2012, with English Translation, 8 pages.
Morohashi, Masayuki et al., "Uniform Way for Retrieving Heterogeneous Data", Information Processing Society of Japan Research Report, Japan, Information Processing Society of Japan, Apr. 18, 1996, vol. 96, No. 34, p. 53-60.
Nagao, Katashi et al., WalkNavi: A Location-Aware Interactive Navigation/Guidance System, Interactive Systems and Software III, Japan, Kindai Kagakusha Co., Ltd., Dec. 10, 1995, First Edition, p. 39-48.
Notice of Allowance from U.S. Appl. No. 11/257,282 dated Nov. 26, 2010, 6 pages.
Office Action from U.S. Appl. No. 12/469,468 issued on Jul. 11, 2011, 29 pages.
Office Action from U.S. Appl. No. 11/256,883 dated Apr. 16, 2009. 16 pages.
Office Action from U.S. Appl. No. 11/256,883 dated May 28, 2008, 19 pages.
Office Action from U.S. Appl. No. 11/256,883 dated Nov. 9, 2007, 15 pages.
Office Action from U.S. Appl. No. 11/257,282 dated May 18, 2007, 14 pages.
Office Action from U.S. Appl. No. 11/257,282 dated Apr. 17, 2008, 11 pages.
Office Action from U.S. Appl. No. 11/257,282 dated Aug. 13, 2008, 12 pages.
Office Action from U.S. Appl. No. 11/257,282 dated Jan. 13, 2009, 13 pages.
Office Action from U.S. Appl. No. 11/257,282 dated Jun. 23, 2009, 13 pages.
Office Action from U.S. Appl. No. 11/257,282 dated Jan. 12, 2010, 10 pages.
Office Action from U.S. Appl. No. 11/460,928 dated Jun. 26, 2008, 18 pages.
Office Action from U.S. Appl. No. 11/566,083 dated Jun. 26, 2008 (18 pages).
Office Action from U.S. Appl. No. 11/566,083 dated Jan. 27, 2009 (20 pages).
Office Action from U.S. Appl. No. 13/092,203 dated Apr. 17, 2012, 16 pages.
Office Action issued in U.S. Appl. No. 13/248,613 on Aug. 1, 2012, 30 pages.
Supplemental European Search Report for Application No. 05853989.1-2201 dated Jul. 8, 2009 (6 pages).
Yahoo!, "Yahoo! Search, My Web 2.0 Beta" [online] 2005 [Retrieved on Oct. 3, 2005] Retrieved from the Internet: <URL: http://myweb2.search.yahoo.com>.
Co-Pending U.S. Appl. No. 13/174,405, filed Jun. 30, 2011 entitled "Ranking Custom Search Results" by Clarence Christopher Mysen et al., 54 pages.

* cited by examiner

RANKING CUSTOM SEARCH RESULTS

RELATED APPLICATION

This application is a divisional of U.S. patent application Ser. No. 11/618,321, filed Dec. 29, 2006, which is incorporated herein by reference.

BACKGROUND

The World Wide Web ("web") contains a vast amount of information. Locating a desired portion of the information, however, can be challenging. This problem is compounded because the amount of information on the web and the number of new users inexperienced at web searching are growing rapidly. Search engines assist users in locating desired portions of this information by cataloging web pages. Typically, in response to a user's request, the search engine returns references to documents relevant to the request.

A web crawler is typically used to find and retrieve documents (e.g., web pages) on the web. To retrieve a document from the web, the web crawler sends a request to, for example, a web server for a document, downloads the entire document, and then provides the document to an indexer. The indexer typically takes the text of the crawled document, extracts individual terms from the text and sorts those terms (e.g., alphabetically) into a search index. The web crawler and indexer repeat this process as the web crawler crawls documents across the web. Each entry in the search index contains a term stored in association with a list of documents in which the term appears and the location within the document's text where the term appears. The search index, thus, permits rapid access to documents that contain terms that match search terms of a user supplied search query. To improve search performance, the indexer typically ignores common words, called stop words (e.g., the, is, on, or, of, how, why, etc.) when creating or updating the search index. Existing indexers create a single search index that contains terms extracted from all documents crawled on the web.

Generally, search engines may base their determination of the user's interest on search terms (called a search query) entered by the user. The goal of the search engine is to identify links to high quality, relevant results (e.g., web pages) based on the search query using the search index. Typically, the search engine accomplishes this by matching the terms in the search query to terms contained in the search index, and retrieving a list of documents associated with each matching term in the search index. Documents that contain the user's search terms are considered "hits" and are returned to the user. The "hits" returned by the search engine may be ranked among one another by the search engine based on some measure of the quality and/or relevancy of the hits. A basic technique for sorting the search hits relies on the degree with which the search query matches the hits. For example, documents that contain every term of the search query or that contain multiple occurrences of the terms in the search query may be deemed more relevant than documents that contain less than every term of the search query or a single occurrence of a term in the search query and, therefore, may be more highly ranked by the search engine.

SUMMARY

According to one aspect, a method may include searching a first search index based on a search query to obtain first search results and searching a second search index based on the search query to obtain second search results. The method may further include ranking the first search results using a first ranking algorithm and one or more first ranking parameters to produce ranked first search results and ranking the second search results using a second ranking algorithm and one or more second ranking parameters to produce ranked second search results, where the one or more first ranking parameters are different than the one or more second ranking parameters. The method may also include providing the ranked first and second search results to a user.

According to another aspect, a method may include uploading custom content from a first user via an application programming interface and indexing the uploaded custom content to produce a custom search index. The method may further include searching the custom content using the custom search index based on a search query received from a second user to obtain custom search results and ranking the custom search results based on at least one of previous user feedback associated with the custom content, annotations of the custom content provided by the first user, or usage patterns associated with other accessing and searching the custom content.

According to a further aspect, a method may include receiving data from a first user designating custom content and indexing the designated custom content to produce a custom search index. The method may further include searching the custom content using the custom search index based on a search query received from a second user to obtain custom search results and ranking the custom search results based on at least one of previous user feedback associated with the custom content, annotations of the custom content provided by the first user, or usage patterns associated with users accessing and searching the custom content.

According to an additional aspect, a method may include obtaining custom content, where obtaining the custom content comprises at least one of uploading custom content from a first user via an application programming interface or receiving data from a first user designating the custom content. The method may further include searching the custom content based on a search query received from a second user to obtain custom search results and obtaining previous user feedback associated with the custom content. The method may also include ranking the custom search results based on the previous user feedback to produce ranked custom search results.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Figure 1:
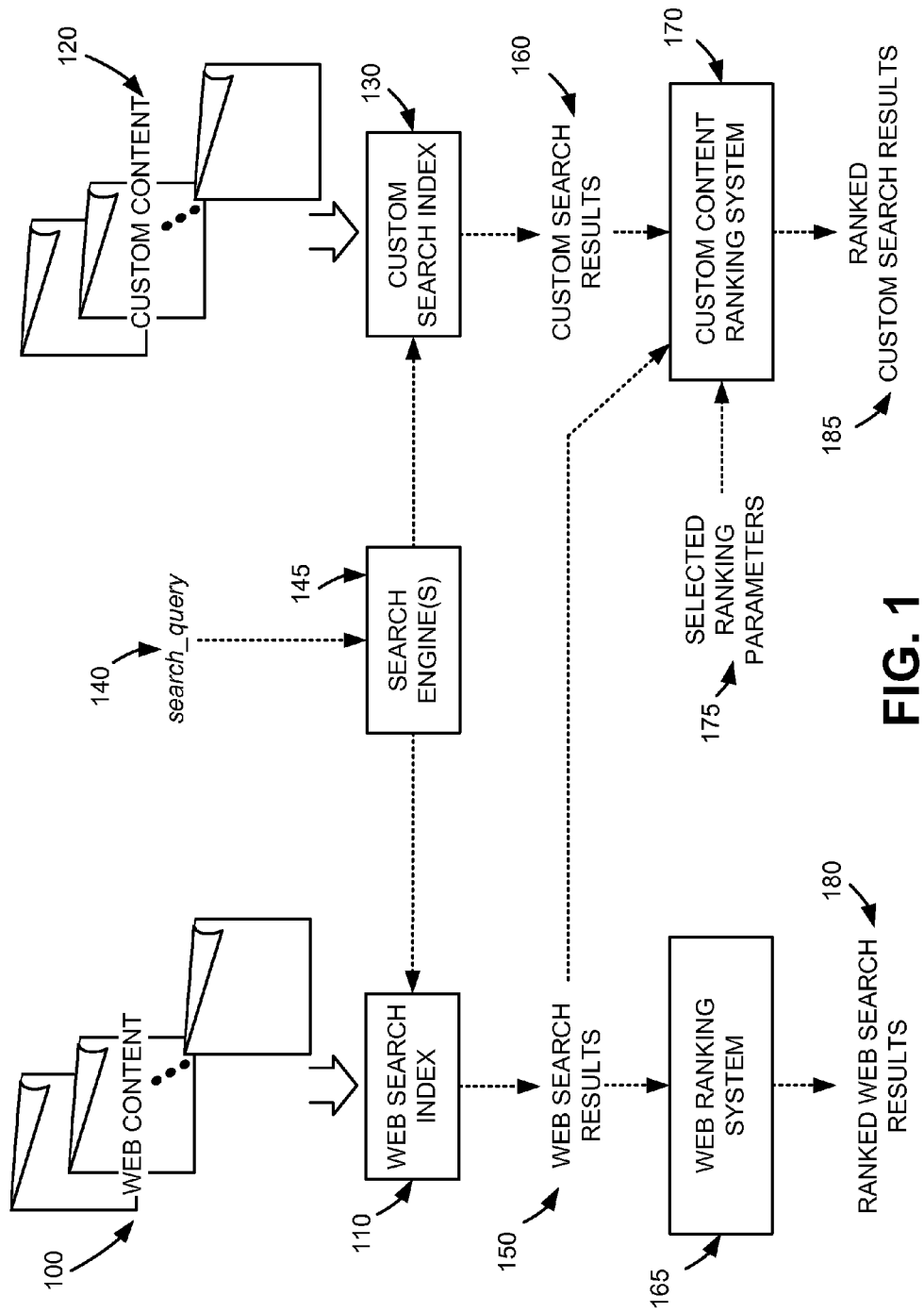
FIG. 1 is a diagram of an overview of an exemplary implementation described herein.

The following detailed description refers to the accompanying drawings. The same reference numbers in different drawings may identify the same or similar elements. Also, the following detailed description does not limit the invention.

Implementations described herein may permit a user to create their own corpora of customized content that may be accessed and searched by other users via a content searching service, such as, for example, Google Search. A content searching system may crawl the web to retrieve web content and then index the retrieved web content to create a web search index. A user may upload or otherwise identify custom content to the content searching system, which may then index the custom content to create a custom search index that is different than the web search index. Each user that uploads, or identifies, custom content may also annotate the custom content to provide explicit indicators of the relative value of different portions of the custom content. Other users may also upload their own custom content to the content searching system, which may then be indexed to create different respective custom search indexes that are different from the web search index and other custom search indexes. Searching of custom content using the different custom search indexes may then be selectively permitted by users who may or may not have to be authenticated to the custom content that they wish to access (e.g., search). For example, the custom search index may store information different from the information stored by the web search index. In one implementation, the custom search index may store a subset of the information stored in the web search index. In this case, it may be possible for the custom search index to store pointers to information in the web search index. Alternatively, or additionally, the custom search index may store information that is not present in the web search index. Also, the custom search index may be considered different from the web search index in the sense that the custom search index may be searchable separate from the web search index.

Results of a search of custom content using a custom search index may be ranked or re-ranked based on the annotations provided by the uploading user, based on usage patterns associated with users who have previously accessed the custom content, or based on explicit user feedback provided by users who have previously accessed the custom content. The ranked/re-ranked custom content search results may be provided in ranked order to the searching user.

A "document," as the term is used herein, is to be broadly interpreted to include any machine-readable and machine-storable work product. A document may include, for example, an e-mail, a website, a business listing, a file, a combination of files, one or more files with embedded links to other files, a news group posting, a blog, a video, an image, a web advertisement, a digital map, etc. In the context of the Internet, a common document is a web page. Documents often include textual information and may include embedded information (such as meta information, images, hyperlinks, etc.) and/or embedded instructions (such as Javascript, etc.). "Content," as the term is used herein, is to be broadly interpreted to include data that may or may not be in document form. Examples of content may include data associated with a document or data in a database. "Custom content," as the term is used herein, is to be broadly interpreted to include content that has been uploaded by a user for indexing and/or content identified by a user for indexing. A "user," as the term is used herein, is to be broadly interpreted to include one or more people (e.g., a person, a group of people that may have some relationship (e.g., people associated with a business or organization), or a group of people with no formal relationship). A "link," as the term is used herein, is to be broadly interpreted to include any reference to/from a document from/to another document or another part of the same document. A "site" as the term is used herein is to be broadly interpreted to include a group of documents hosted by any type of entity. A "site" may include a group of documents under common control, such as a group of documents associated with an organization, a domain name, a host name, or a set of documents created by the same person or group of persons. A "site" may also include a group of documents about a particular topic, a group of documents in a particular language, a group of documents hosted in a particular country, or a group of documents written in a particular writing style.

OVERVIEW

FIG. 1 is a diagram of an overview of an exemplary implementation described herein. As shown in FIG. 1, web content 100 may be retrieved using, for example, a web crawler (not shown). The web crawler may find and retrieve documents (e.g., web pages) stored on the web and extract content from the documents. For example, the web crawler may send a request to a web server for a document, download the entire document, and then provide the document to an indexer (not shown). The indexer may then index the retrieved web content to create a web search index 110. The indexer extracts text from the content of the crawled document, extracts individual terms or other data from the text, and sorts those terms or other data (e.g., alphabetically) into web search index 110. Other techniques for extracting and indexing content, that are more complex than simple word-level indexing, may also be used, including techniques for indexing extensible markup language (XML) data, images, videos, etc. Each entry in web search index 110 may contain a term or other data stored in association with a list of documents in which the term or other data appears and the location within the document where the term or other data appears. Web search index 110 may subsequently be used to search for specific documents whose content matches a search query 140.

As further shown in FIG. 1, custom content 120 may also be obtained. Custom content 120 may include content uploaded by a user, content designated by the user as being part of its custom content (e.g., user designates one or more websites or web pages to be included in the user's custom content), web content that is available only to selected subscribers via subscription, or types of content that may be aggregated and indexed separately from web search index 110 (e.g., the user may designate websites or web pages that contain content about a selected topic as being included in the user's custom content). An indexer (not shown) may index the obtained custom content to create a custom search index 130 that may be different from web search index 110 (e.g., custom search index 130 may include information different from web search index 110 and/or custom search index 130 may be searchable separate from web search index 110). The indexer may take the full text or other data from custom content 120, extract individual terms or other data from custom content 120 and sort those terms or other data (e.g., alphabetically) into custom search index 130. Other techniques for extracting and indexing content, that are more complex than simple word-level indexing, may also be used, including techniques for indexing XML data, images, videos, etc. Each entry in custom search index 130 may contain a term or other data stored in association with a location within custom content 120 where the term or other data appears. Custom search index 130 may subsequently be used to search for specific content of custom content 120 that matches a search query 140. Custom search index 130 may include multiple custom search indexes (not shown), each being associated with a different corpus of custom content.

Search engine(s) 145 may receive search query 140 and may selectively search either web search index 110 or custom search index 130 (or multiple different custom search indexes), or may search both of web search index 110 and custom search index 130 (or other different custom search indexes), using search query 140. A search of web search index 110 by search engine(s) 150 may return web search results 150 that match search query 140. A search of custom search index 130 by search engine(s) 150 may return custom search results 160 that match search query 140. A web ranking algorithm 165 may rank (or re-rank) web search results 150 to produce ranked web search results 180. Web ranking algorithm 165 may include any existing ranking algorithm used to order search results.

A custom content ranking algorithm 170 may rank or re-rank custom search results 160 to produce ranked custom search results 185. Custom content ranking algorithm 170 may, in some implementations, rank or re-rank custom search results 160 based on selected ranking parameters 175. Selected ranking parameters 175 may include different identified parameters to be used by custom content ranking algorithm 170 when ranking/re-ranking custom search results 160. Ranking parameters 175 may, for example, be selected by the user that uploaded, or identified, custom content 120. Such different parameters may include, but are not limited to, annotations by the user that uploaded or identified custom content 120 that indicate the relative importance or value of different portions of custom content 120, usage patterns of users who have accessed custom content 120 or other custom content (not shown), or user feedback provided by users who have searched custom content 120 and have provided indications of their opinion of the quality of custom content 120 returned to them as the result of the search. Custom content ranking algorithm 170 may use the selected ranking parameters 175 when ranking/re-ranking custom search results 160. Custom content ranking algorithm 170 may include a different ranking algorithm than web ranking algorithm 165.

Exemplary Network Configuration

Figure 2:
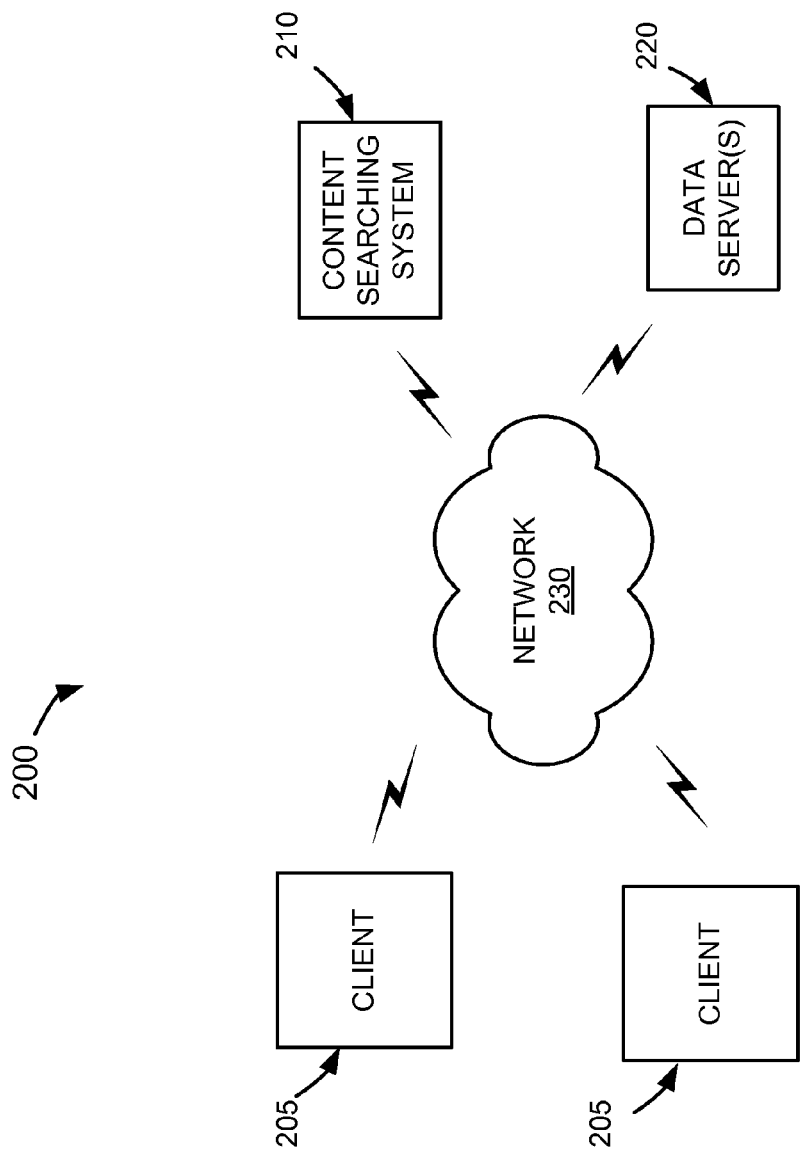
FIG. 2 is an exemplary diagram of a network in which systems and methods described herein may be implemented.

FIG. 2 is an exemplary diagram of a network 200 in which systems and methods described herein may be implemented. Network 200 may include multiple clients 205 connected to a content searching system 210 and data server(s) 220 via a network 230. Two clients 205, a single content searching system 210 and one or more data servers 220 have been illustrated as connected to network 230 for simplicity. In practice, there may be more or fewer clients, content searching system, and data servers. Also, in some instances, a client 205 may perform one or more functions of content searching system 310 or server(s) 220 and/or content searching system 210 or a server 220 may perform one or more functions of a client 205.

Clients 205 may include client entities. A client entity may be defined as a device, such as a personal computer, a wireless telephone, a personal digital assistant (PDA), a lap top, or another type of computation or communication device, a thread or process running on one of these devices, and/or an object executable by one of these devices. Clients 205 may implement a browser for browsing documents stored data server(s) 220. Clients 205 may also use the browser for accessing content searching system 210 to search documents (e.g., web content) associated with data server(s) 220 and/or custom content, as described further below.

Data server(s) 220 may store or maintain documents that may be browsed by clients 205, or may be crawled by content searching system 210. Such documents may include data related to published news stories, products, images, user groups, geographic areas, or any other type of data. For example, data server(s) 220 may store or maintain news stories from any type of news source, such as, for example, the Washington Post, the New York Times, Time magazine, or Newsweek. As another example, server(s) 230 may store or maintain data related to specific products, such as product data provided by one or more product manufacturers. As yet another example, server(s) 230 may store or maintain data related to other types of web documents, such as pages of web sites (e.g., web content).

Content searching system 210 may include one or more hardware and/or software components that access, fetch, index, search, and/or maintain general web documents and/or custom content documents. Content searching system 210 may implement a data aggregation service by crawling a corpus of documents (e.g., web pages) hosted on data server(s) 220, indexing the documents, and storing information associated with these documents in a repository of crawled documents. The aggregation service may be implemented in other ways, such as by agreement with the operator(s) of data server(s) 220 to distribute their documents via the data aggregation service.

While content searching system 210 and server(s) 220 are shown as separate entities, it may be possible for content searching system 210 to perform one or more of the functions of one or more of servers 220, and vice versa. For example, it may be possible for content searching system 210 and one or more of servers 220 to be implemented as a single entity. It may also be possible for a single one of content searching system 210 or server(s) 220 to be implemented as two or more separate (and possibly distributed) devices.

Network 230 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet or a combination of networks. The PLMN(s) may further include a packet-switched sub-network, such as, for example, General Packet Radio Service (GPRS), Cellular Digital Packet Data (CDPD), or Mobile IP sub-network. Clients 205, content searching system 210 and server(s) 220 may connect to network 230 via wired and/or wireless connections.

Exemplary Content Searching System

Figure 3:
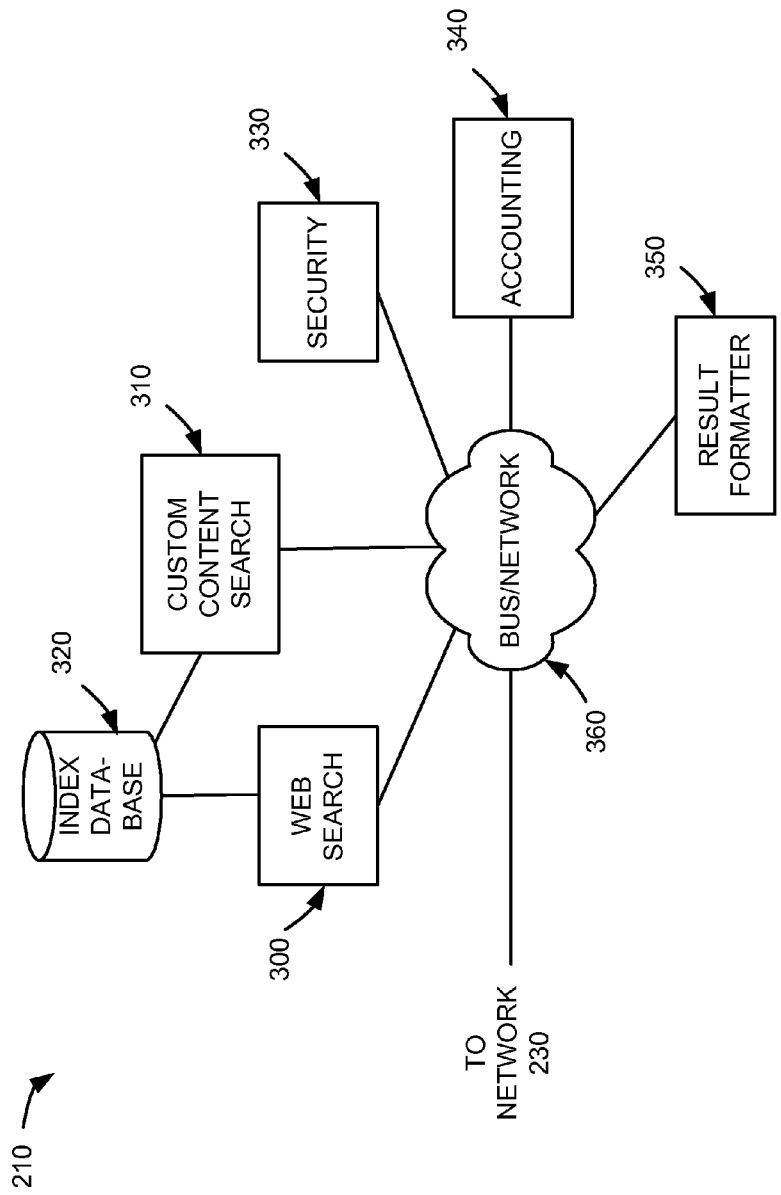
FIG. 3 is an exemplary diagram of the content searching system of FIG. 2.

FIG. 3 is an exemplary diagram of content searching system 210. As shown in FIG. 3, content searching system 210 may include a web search unit 300, a custom content search unit 310, an index database 320, a security unit 330, an accounting unit 340 and a result formatter 360 interconnected via a bus and/or network 360 with network 230. Web search unit 300, custom content search unit 310, security unit 330, accounting unit 340 and result formatter 350 may be implemented as one or more separate server entities, as software and/or hardware components within a single server entity, or as software and/or hardware components distributed across multiple server entities.

Web search unit 300 may crawl documents (e.g., containing web content) stored at data server(s) 220, index the crawled documents to create a web search index and search the crawled documents using the web search index. Custom content search unit 310 may obtain custom content, such as, for example, content uploaded from users, content obtained from sources that require subscriptions for access to the content, and/or content on a given topic that may be obtained and aggregated from multiple sources, index the content in separate custom search indexes to create multiple different custom search indexes and search the custom content using one or more of the different custom search indexes.

Index database 320 may store a web search index 110 and one or more custom search indexes 130. Index database 320 may store web search index 110 and the one or more custom search indexes as different data structures that may be searched independently of one another. Alternatively, index database 320 may store one or more custom search indexes 130 within the same data structure as web search index 110 in a manner that they may be searched independently of one another. Security unit 330 may authenticate users desiring to upload custom content to custom content search unit 310 and/or may authenticate users desiring to search one or more custom content indexes associated with custom content. Security unit 330 may authenticate users by passing authentication tokens to the users which define the custom search indexes that are accessible by a particular user, and may contain security keys to permit channel encryption for sensitive information. Security unit 330 may authenticate users and authorize custom content search unit 310 to permit access to selected custom search indexes to the authenticated users.

Accounting unit 340 may establish and modify user access rights, may record and report user access to selected custom search indexes, may obtain feedback from users accessing given custom search indexes and/or may track and control access to given custom search indexes based on whether users have subscribed to the custom search indexes.

Result formatter 350 may return search results obtained from web search unit 300 and custom content search unit 310 in a formatted and organized manner. Result formatter 350 may combine custom content search results together with web content search results in a way that is meaningful to the user (e.g., in a hypertext markup language (HTML) page).

Bus and/or network 360 may include a communication path, such as, for example, a system bus or a network that permits web search unit 300, custom content search unit 310, security unit 330, accounting unit 340 and result formatter 350 to communicate with one another and with entities on network 230.

Although FIG. 3 shows exemplary components of content searching system 210, in other implementations, content searching system 210 may include fewer, different, or additional components than depicted in FIG. 3. In still other implementations, one or more components of content searching system 210 may perform the tasks performed by one or more other components of content searching system 210.

Exemplary Web Search Unit

Figure 4:
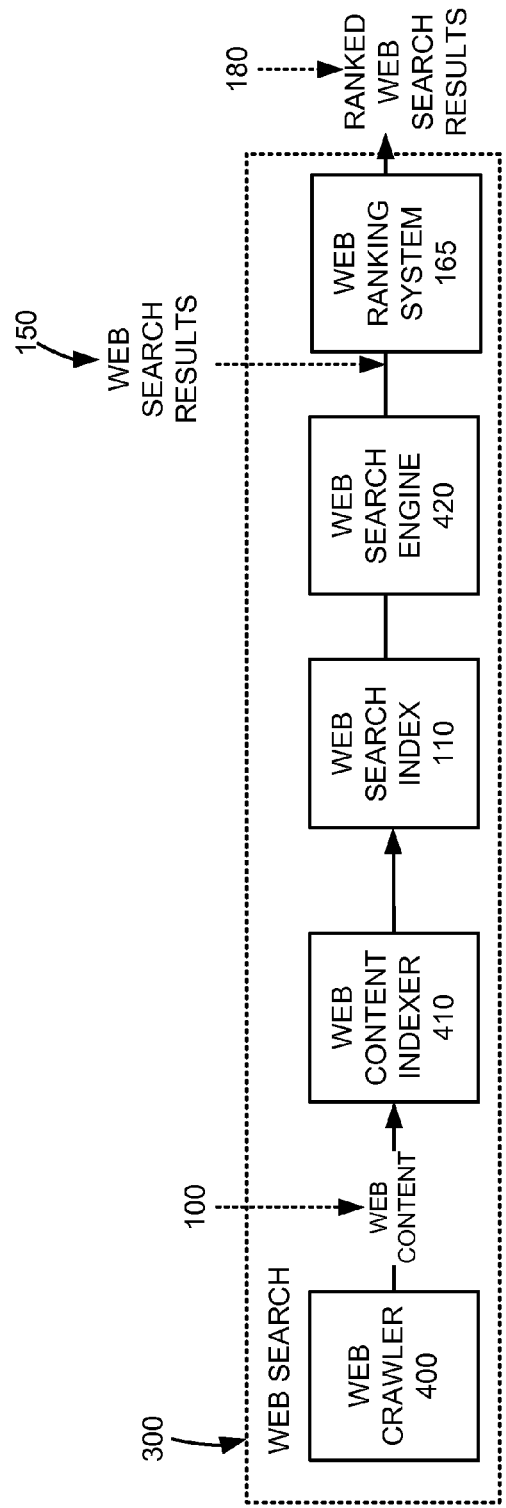
FIG. 4 is an exemplary diagram of the web search unit of FIG. 3.

FIG. 4 is an exemplary diagram of web search unit 300. As shown in FIG. 4, web search unit 300 may include a web crawler 400, a web content indexer 410, a web search index 110 and a web search engine 420.

Web crawler 400 may find and retrieve web content 430 (e.g., web pages) and provide the retrieved web content 430 to web content indexer 410. For example, web crawler 400 may send a request to a web server for a web document, download the entire web document, and then provide the web document to web content indexer 410. Web content indexer 410 may index web content 430 to create web search index 110. For example, web content indexer 410 may take the text or other data of a given crawled document, extract individual terms or other data from the text of the document and sort those terms or other data (e.g., alphabetically) in web search index 110. Other techniques for extracting and indexing content, that are more complex than simple word-level indexing, may also be used, including techniques for indexing XML data, images, videos, etc. Each entry in web search index 110 may contain a term or other data stored in association with a list of documents in which the term or other data appears and the location within the document where the term or other data appears. Web search engine 420 may search web search index 110, based on a received search query, to match terms of the search query with terms or other data (e.g., video, images, etc.) contained in entries in web search index 110. Web search engine 420 may retrieve a corresponding list of documents from each entry in web search index 110 that matches a term of the search query. The lists of documents retrieved from one or more entries in web search index 110 may be returned as web search results 440. In one implementation, each result of web search results 440 may include a uniform resource locator (URL) associated with a corresponding search result document and, possibly, a snippet of content extracted from the corresponding search result document. Web search engine 420 may further rank web search results 440 using web ranking algorithm 165.

Exemplary Custom Content Search Unit

Figure 5:
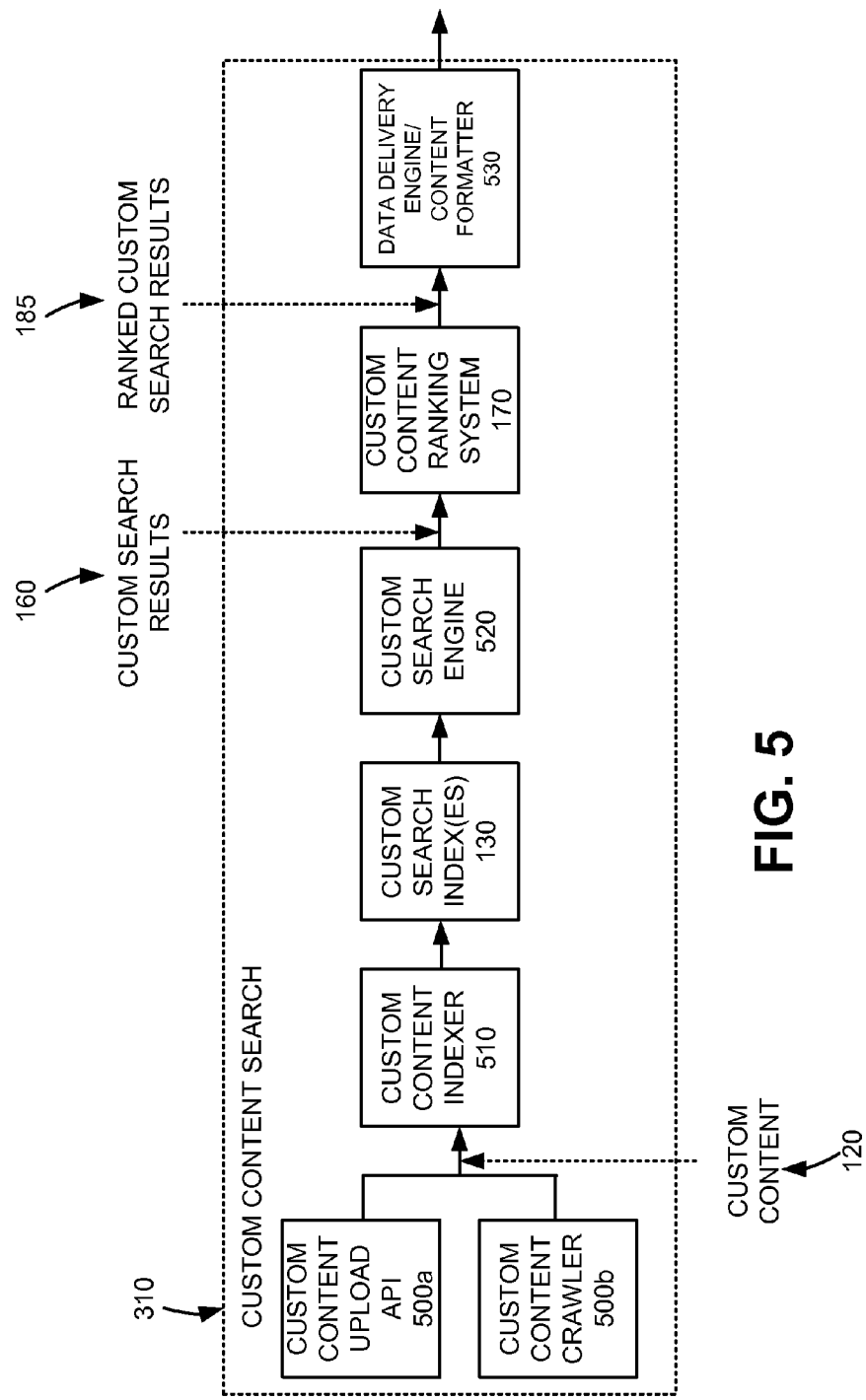
FIG. 5 is an exemplary diagram of the custom content search unit of FIG. 3.

FIG. 5 is an exemplary diagram of custom content search unit 310. As shown in FIG. 5, custom content search unit 310 may include a custom content upload Application Programmer Interface (API) 500a, a custom content crawler 500b, a custom content indexer 510, one or more custom search indexes 130, a custom search engine 520 and a data delivery engine/content formatter 530.

Custom content upload API 500a may receive custom content 120 uploaded from one or more users (e.g., one or more authenticated users). The uploaded content may include data in any type of format. In one implementation, the uploaded content may include meta-data (e.g., XML data). The metadata may include content meta-data with pointers to actual content. In another implementation, custom content upload API 500a may include a translation engine for translating any type or format of uploaded data into a particular type or format of data that can be more easily processed by custom content indexer 510. Custom content upload API 500a may pass the received custom content 120 to custom content indexer 510.

Custom content crawler 500b may crawl specific content on the web to retrieve documents that may be indexed in a corresponding custom search index 130. Custom content crawler 500b may crawl any type of document or database, including, for example, flatfiles, binary files, etc. For example, custom content crawler 500b may crawl available documents on the web containing content directed to a specific topic (e.g., dogs, football, etc.) or documents identified by a custom content provider. As another example, custom content crawler 500b may crawl documents similar to documents identified by the user as being part of the user's custom content. The user may, thus, designate content that may be grouped together and searched via the user's custom search index. Custom content crawler 500b may, in some implementations, need to be authenticated by content providers associated with specific custom content crawled on the web. Custom content crawler 500b may pass the crawled custom content 120 to custom content indexer 510.

Custom content indexer 510 may index custom content 120 to create custom search index(es) 130. For example, custom content indexer 510 may take the text or other data of custom content 120 received from a user, extract individual terms from the text or other data of custom content 120, and sort those terms or other data (e.g., alphabetically) into a single custom search index 130. Other techniques for extracting and indexing content, that are more complex than simple word-level indexing, may also be used, including techniques for indexing XML data, images, videos, etc. Each entry in a custom search index 130 may contain a term or other data stored in association with an item of content in which the term or other data appears and a location within the custom content where the term or other data appears.

Custom search engine 520 may search custom search index(es) 130, based on a received search query, to match terms of the search query with terms or other data contained in entries in custom search index(es) 130. If custom search index(es) 130 includes multiple different custom search indexes, then custom search engine 520 may search, based on the received search query and, possibly, user authentication, selected ones of the different custom search indexes. Custom search engine 520 may retrieve a corresponding list of items of custom content from each entry in custom search index 130 that matches a term of the search query. Custom search engine 520 may rank (or re-rank), using custom content ranking algorithm 170, each item in the list of items of custom content relative to one another to produce an ordered list of items of custom content. The ranked list of items of content retrieved from one or more entries in custom search index 130 may be returned as custom search results 540. In one implementation, each result of custom search results 540 may include a uniform resource locator (URL) associated with a corresponding search result document and, possibly, a snippet of content extracted from the corresponding search result document.

Data delivery engine/content formatter 530 may receive the search results from custom search engine 520, format the search results into a meaningful data format (e.g., into a hypertext markup language (HTML) document) that can be received and displayed by the user (e.g., via a web browser).

Data deliver engine/content formatter 530 may customize the formatting of the search results (e.g., the content and visual format of the data) received from custom search engine 520 based on individual user preferences or based on the preferences of the custom content provider whose content is being searched.

Exemplary Index Database

Figure 6:
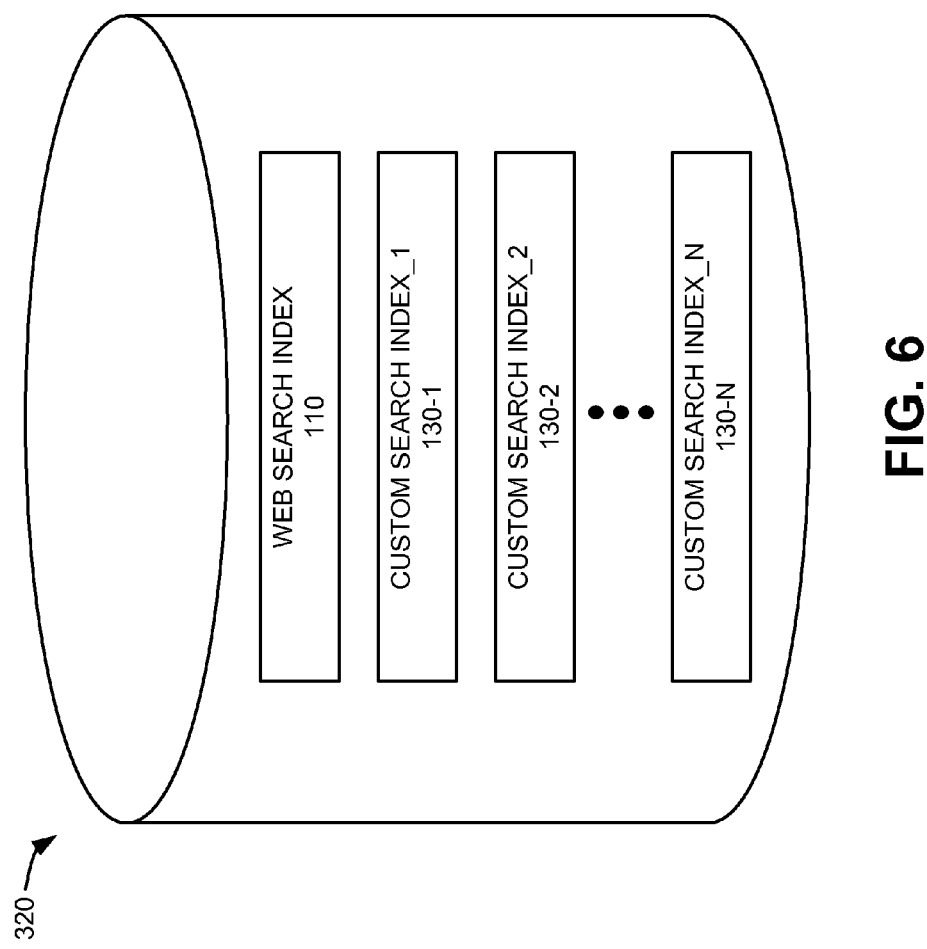
FIG. 6 is an exemplary diagram of the index database of FIG. 3.

FIG. 6 is an exemplary diagram of index database 320. As shown in FIG. 6, index database 320 may include a web search index 110 and one or more custom search indexes 130-1 through 130-N (where N≥1). Each of custom search indexes 130-1 through 130-N may include data structures that are separate and distinct from one another, and from web search index 110. Web search index 110 may include multiple entries, with each entry containing a term or other data stored in association with a list of documents in which the term or other data appears and the location within the document text where the term or other data appears. Web search engine 420 may search web search index 110 based on a received search query to match terms of the search query with terms or other data contained in entries of web search index 110.

Each one of custom search indexes 130-1 through 130-N may include multiple index entries, with each entry containing a term or other data stored in association with an item of custom content in which the term or other data appears and a location within the custom content where the term or other data appears. Custom search engine 520 may search custom search index(es) 130, based on a received search query, to match terms of the search query with terms or other data contained in entries in custom search index(es) 130.

Exemplary Custom Content with Annotations

Figure 7:
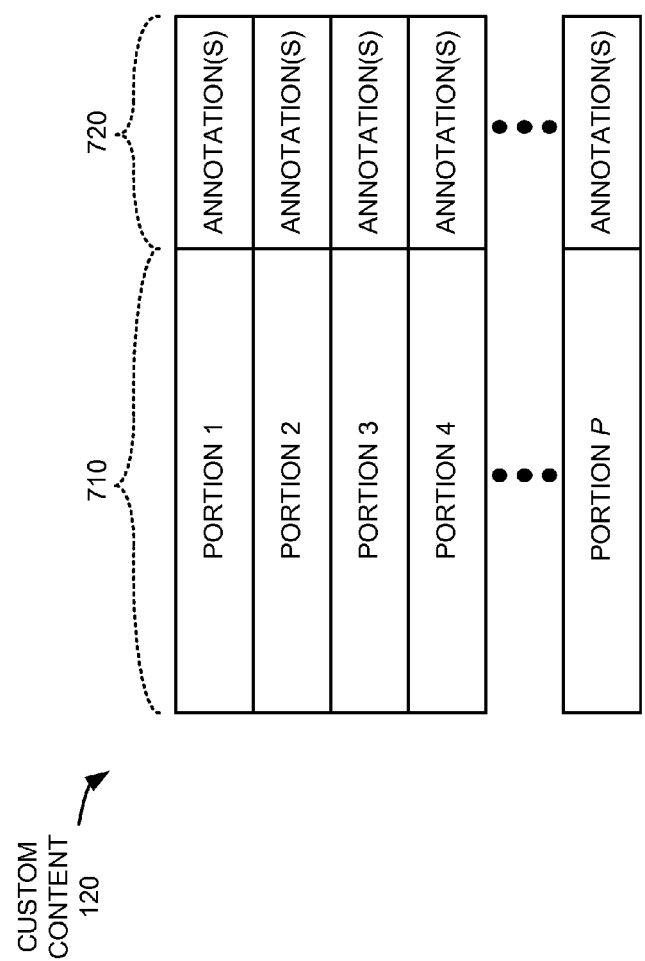
FIG. 7 is an exemplary diagram of annotated portions of custom content.

FIG. 7 illustrates custom content 120, associated with a given custom search index 130, that may be annotated by the user that uploaded (or identified) the custom content 120. Custom content 120 may include one or more portions 710, with each portion 710 having one or more annotations 720 associated with it. Each portion 710 may identify a subdivision of custom content 120. For example, if custom content 120 includes a set of documents, then each portion 710 may identify one document from the set of documents. Each annotation 720 may provide an indication of the relative value or importance of a corresponding portion 710 of custom content 120. Each annotation 720 may be provided by the user that uploaded (or identified) custom content 120.

Exemplary Content Indexing Process

Figure 8:
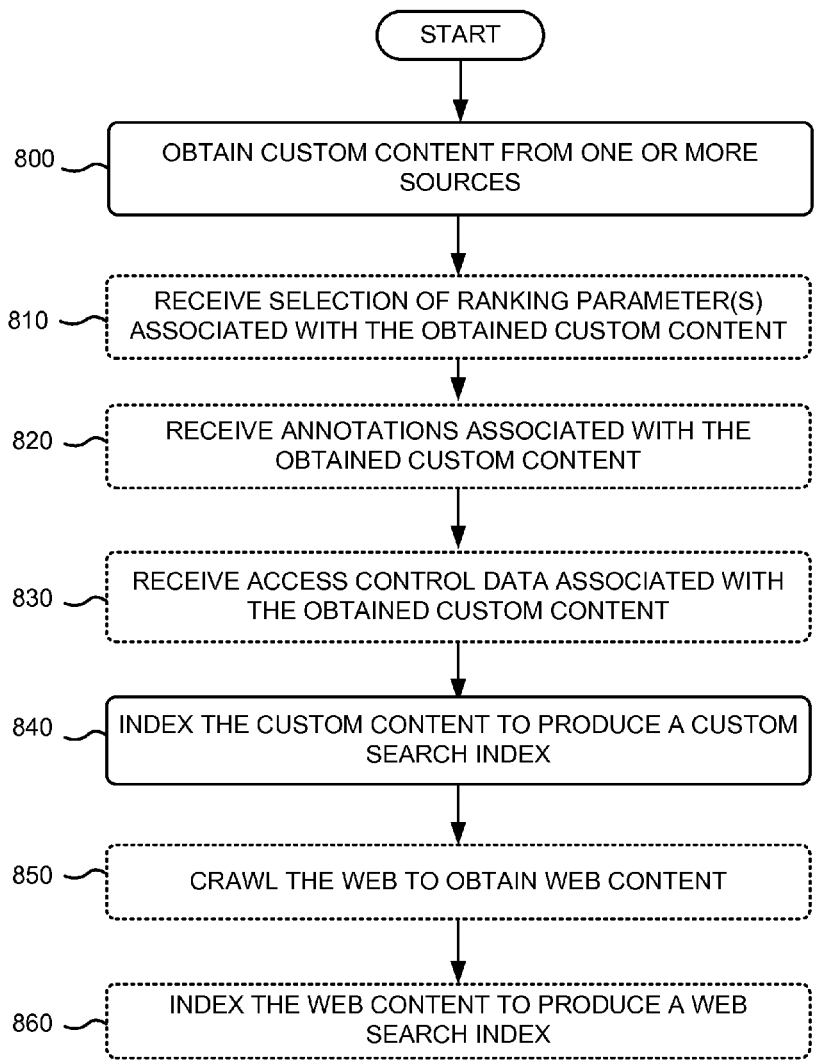
FIG. 8 is a flowchart of an exemplary process for obtaining and indexing custom content.

FIG. 8 is a flowchart of an exemplary process for obtaining and indexing custom content and, possibly, web content. The process exemplified by FIG. 8 may be performed by content searching system 210.

The exemplary process may begin with obtaining custom content from one or more sources (block 800). For example, custom content upload API 500 may upload custom content from one or more users at clients 205. As another example, custom content upload API 500 may upload subscription content from one or more subscription content service providers. As an additional example, subscription content from one or more subscription content service providers, or content from documents obtained from multiple sources that is related to a same topic, may be obtained from custom content crawler 500b of custom content search unit 310 for indexing in respective custom indexes. Alternatively, a user at a client 205 may designate a set of documents to be indexed separately as a corpus of custom content. For example, a user at a client 205 may designate a set of web sites or web pages from which content may be extracted and indexed in a separate custom search index.

Many different types of custom content may be uploaded and indexed consistent with exemplary embodiments. For example, a given custom search index may aggregate and index multiple subscription-based web sites. If a user subscribes to a group of subscription-based web sites, then the user can search content from all of the subscription-based web sites simultaneously using a single custom search index. As another example, a company may upload all of their company events, policies, etc. to a custom search index such that only company employees may search the custom search index. As an additional example, a company, such as, for example, Netflix, may upload custom content to their own custom search index. Netflix can increase traffic to their own web site by building a custom search index of their movie titles. Users may then join a Netflix custom index group and automatically receive movie title search results when they perform a regular web search (e.g., a search on google.com). Moreover, Netflix could tag new movie releases so that Netflix users can just type the search query "new releases" in, for example, the Google search interface and receive newly released movie titles as part of the returned search results. As yet another example, a software company, such as, for example, Oracle, could upload their knowledge base to their own custom search index and then make this knowledge base available only to licensed users. The knowledge base could include frequently asked questions (FAQs), documentation, troubleshooting tips, customer support information, bugs, etc. As a further example, local libraries, Amazon.com or Barnes & Nobles could create their own custom indexes. Then, when a user who enjoys reading books searches a topic (e.g., using Google search) and when there are books that match that search, the books may be returned as results in the search results so that the user may check for pricing and/or availability. As yet another example, a user could create a custom search index relating to a particular topic by identifying documents (e.g., web documents) relating to that topic. As another example, a user can create a custom search index containing his bookmarks (e.g., favorite web pages or sites) that can be shared with, and/or searched, by other users.

Figure 9:
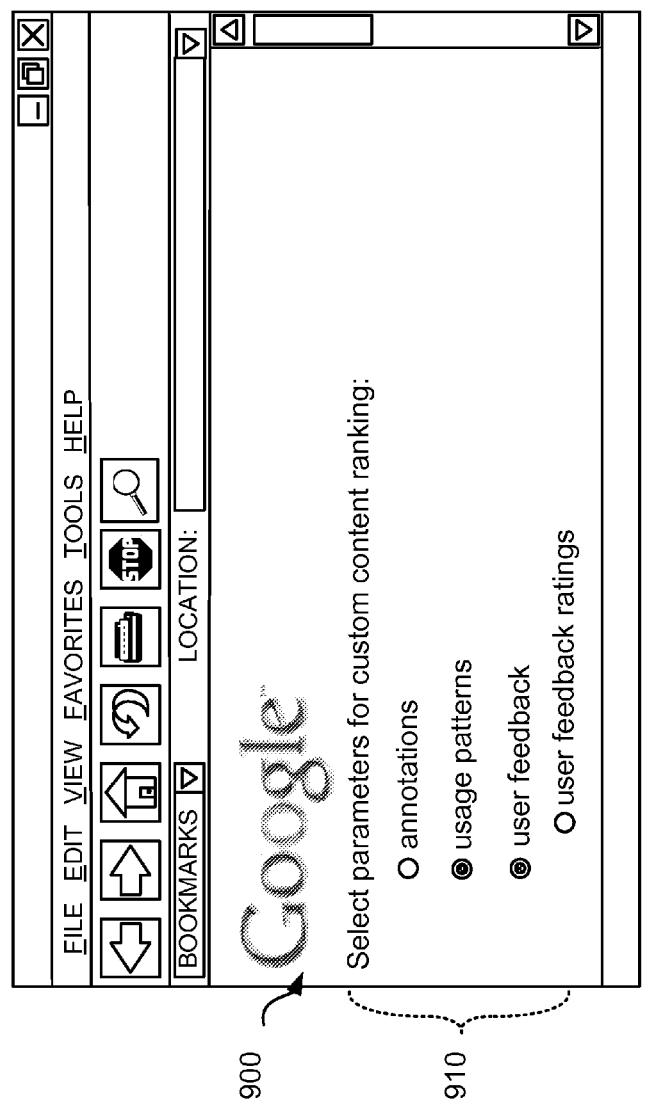
FIG. 9 is an exemplary diagram of a document that a content provider may use to select parameters for ranking of its custom content.

A selection of one or more ranking parameters 175 associated with the obtained custom content may be received (optional block 810). Ranking parameters 175 may include different parameters to be used by custom search engine 520 when executing custom content ranking algorithm 170 for ranking/re-ranking custom search results 160. Ranking parameters 175 may, for example, be selected by the user that uploaded, or identified, custom content 120. Such different parameters may include, but are not limited to, annotations by the user that uploaded or identified custom content 120 that indicate the relative importance or value of different portions of custom content 120, usage patterns of users who access custom content 120 or other custom content, or user feedback provided by users who have accessed custom content 120 and have provided indications of their opinion of the quality of custom content 120 that they have accessed (e.g., searched). FIG. 9 illustrates an exemplary user interface 900 that may be used by a user that uploaded or identified custom content to select one or more parameters to be used when ranking search results obtained from searching the user's custom content. As shown in FIG. 9, user interface 900 may display ranking parameters 910 that may be selected by the user (e.g., by clicking on a corresponding check box). In the exemplary implementation shown in the user interface 900 of FIG. 9, ranking parameters 910 may include annotations, usage patterns, user feedback and user feedback ratings.

Annotations associated with the obtained custom content may be received (optional block 820). Each user that uploads or identifies custom content may annotate one or more portions of the custom content to indicate the relative value or importance of a respective portion of custom content. Each annotation(s) 720 may be stored in association with a corresponding portion 710 of custom content 120, as shown in FIG. 7.

Access control data associated with the obtained custom content may be received (optional block 830). Access control data may include data used for authenticating users who may supply additional custom content to a given custom search index or for authenticating users who may access and search custom content associated with a given custom search index. For example, the access control data may include a log-in identifier and a password for a respective user. Authentication unit 600 may store the received access control data for use in subsequent user authentication. Each custom search index 130-1 through 130-N may, or may not, have access control data associated with it. Thus, some of custom search indexes 130-1 through 130-N may be restricted to authenticated users (e.g., subscribing users) while others may not (e.g., available to non-subscribing users). The received access control data may also be associated with other custom content. Therefore, a given user may subscribe to, or have an account that is associated with, N different custom search indexes, thus, permitting the given user to search those indexes automatically for each of the user's searches. The The custom content may be indexed to produce a custom search index (block 840). For example, custom content indexer 510 may take custom content 120 received from an authenticated user (e.g., the custom content provider), extract individual terms or other data from custom content 120, and sort those terms (e.g., alphabetically) into a custom search index 130. Each entry in a custom search index 130 may contain a term or other data stored in association with an item of content in which the term or other data appears and a location within the custom content where the term or other data appears. Custom search index 130 may be stored in index database 320.

The web may be crawled to obtain web content (optional block 850). For example, web crawler 400 may find and retrieve web content 430 (e.g., from web documents) and hand the retrieved web content 430 off to web content indexer 410. Web crawler 400 may send a request to a web server for a web page, download the entire web page, and then hand the web page off to web content indexer 410.

The obtained web content may then be indexed to produce a web search index 110 (optional block 860). Web content indexer 410 may index received web content 430 to create web search index 110. For example, web content indexer 410 may take the text or other data of a given crawled document, extract individual terms or other data from the document and sort those terms or other (e.g., alphabetically) into web search index 110. Each entry in web search index 110 may contain a term or other data stored in association with a list of documents in which the term or other data appears and the location within the document's text where the term or other data appears. Web search index 110 may be stored in index database 320.

Exemplary Content Searching Process

Figure 10A:
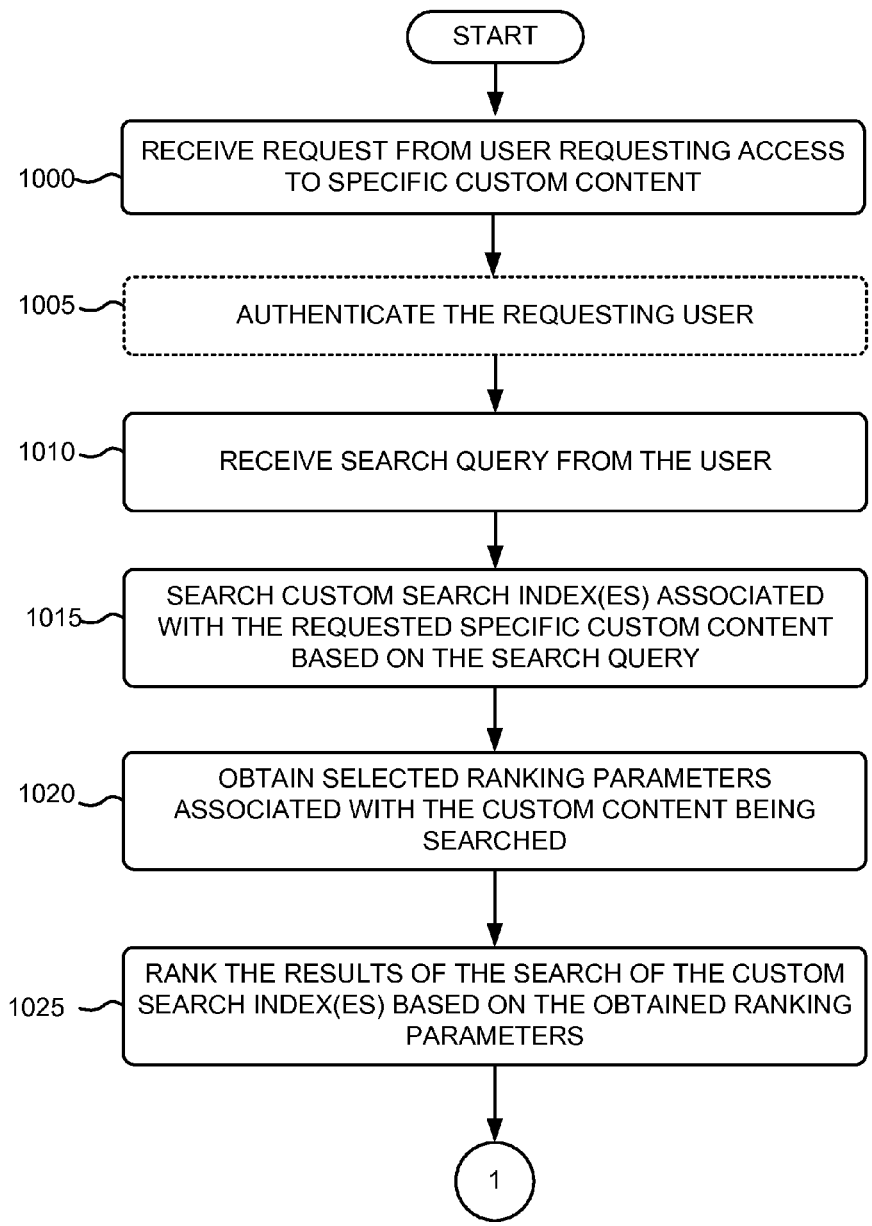
FIGS. 10A and 10B is a flowchart of an exemplary process for searching a custom search index and ranking/re-ranking search results obtained from the search.
Figure 10B:
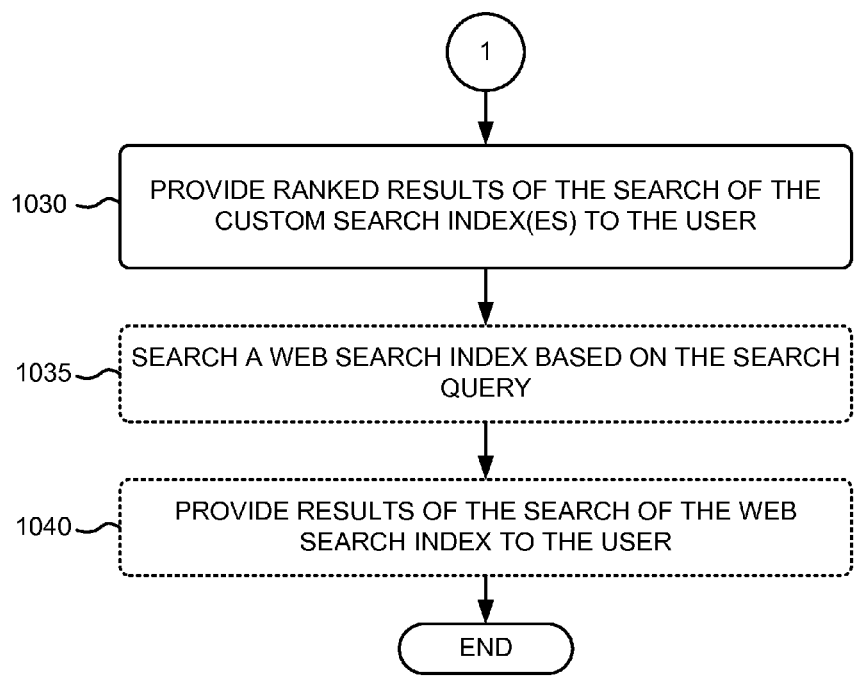

FIGS. 10A and 10B is a flowchart of an exemplary process for searching one or more custom search indexes produced, for example, using the exemplary process of FIG. 8 and ranking or re-ranking custom search results obtained from the search. The process exemplified by FIGS. 10A and 10B may be performed by content searching system 210.

Figure 11:
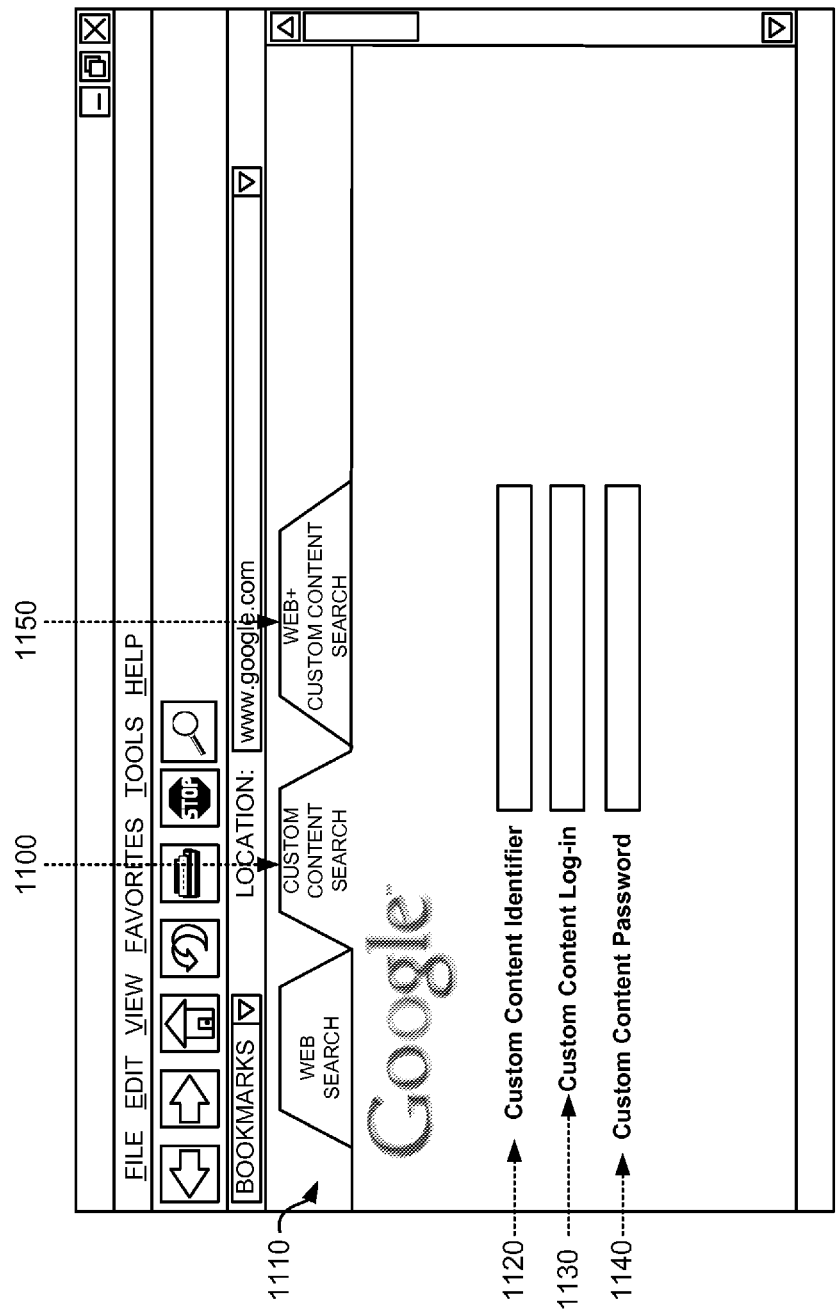
FIG. 11 is an exemplary diagram of a document that a user may use to authenticate himself before searching custom content.

The exemplary process may begin with the receipt of a request from a user requesting access to specific custom content (block 1000). For example, the access request may include a log-in identifier and password supplied by the user. As shown in FIG. 11, a user at a client 205 may select a "custom content search" tab 1100 contained in a search document 1110 displayed by the user's browser. Fields, such as, for example, a custom content identifier field 1120, a custom content log-in field 1130 and a custom content password field 1140 may then be displayed in search document 1310. The user may then enter appropriate data into fields 1120, 1130 and 1140 to authenticate himself as having a right to access the desired custom content. As further shown in FIG. 11, the user at client 205 may select a "web+custom content search" tab 1150. The user may enter appropriate data into fields 1120, 1130 and 1140 to search a specific custom search index and the web search index. Any custom content identifier data entered into custom content identifier field 1120 may be associated with one or more custom search indexes. For example, a single given custom content identifier may be associated with, and allow access to, several different custom search indexes. In another implementation, a given custom content log-in and custom content password may be implicitly associated with one or more custom search indexes. In this implementation, the user does not have to explicitly identify the custom content that he desires to access, since the user's log-in and password has already been associated with one or more custom search indexes. In other implementations, the user may enter multiple different custom content identifiers to select multiple custom search indexes to search. In some implementations in which the custom content does not require authentication (e.g., is available to non-subscribers), mere selection of specific custom content, without user authentication, may only be required for access to the specific custom content.

The requesting user may then be authenticated (optional block 1005). Authentication unit 600 may authenticate the user using previously received access control data. For example, authentication unit 600 may authenticate the user using the log-in identifier and password supplied by the user. If authentication unit 600 authenticates the user, then the exemplary process may continue with block 1010. If authentication unit 600 does not authenticate the user, then the user will be denied access to the requested custom content. Authentication of the user may occur at the time at which the user requests access to specific custom content, or the authentication may have occurred earlier. For example, a user may log-in at the time the user first accesses search document 910 prior to the user requesting access to specific custom content. For some of the specific custom content associated with a respective custom search index(es), user authentication may not be required and, thus, block 1005 may be skipped.

Figure 12:
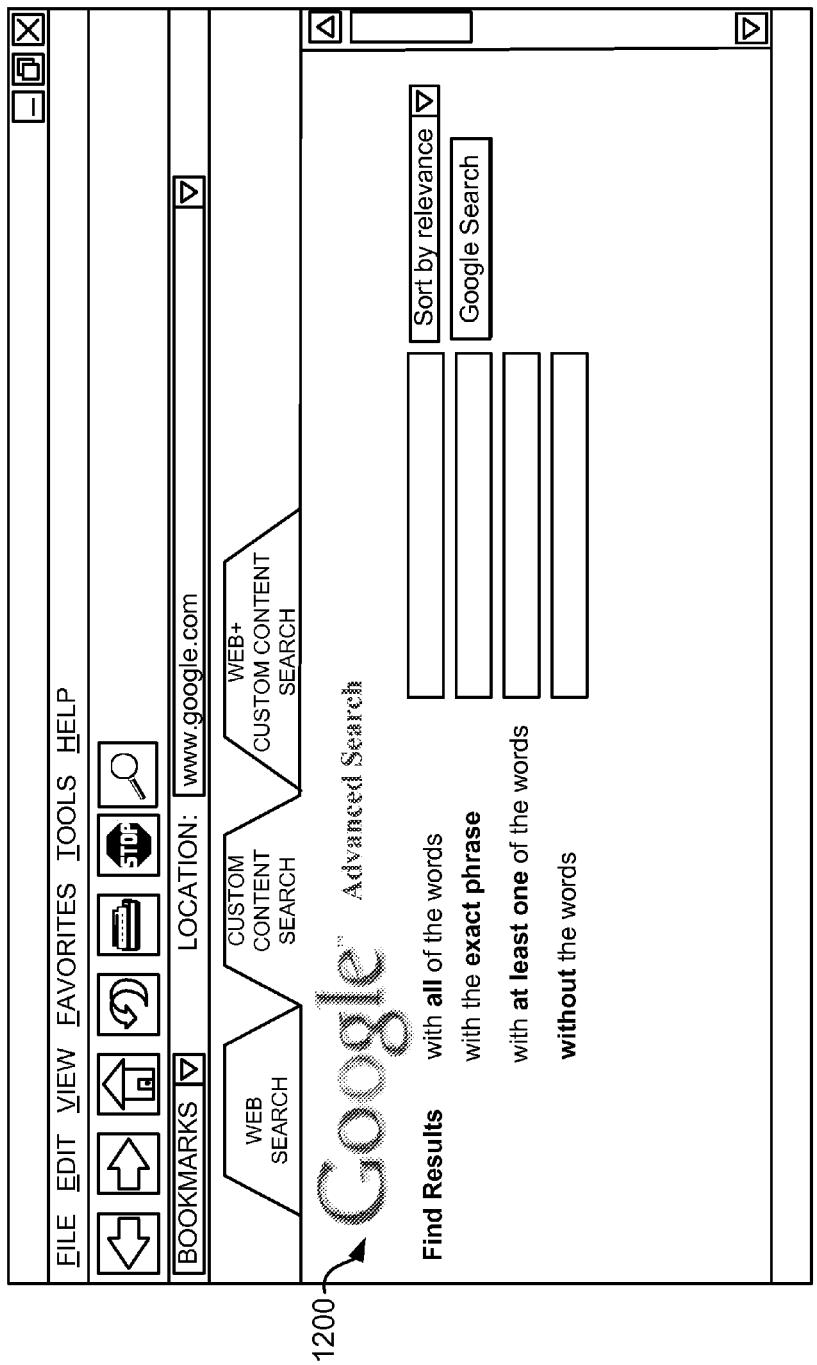
FIG. 12 is an exemplary diagram of a search document that a user may use to enter search terms of a search query.

A search query may be received from the user (block 1010). Custom search engine 520 may receive a search query from a user at a client 205 via network 230. For example, as shown in FIG. 12, a user may enter search terms of a search query into a search document 1200 displayed by the user's browser. One or more custom search indexes associated with the specific custom content that the user requested access to (e.g., corresponding to the custom content identifier(s) supplied by the user) may be searched based on the received search query (block 1015). Custom search engine 520 may search one or more custom search indexes 130-1 through 130-N associated with the specific custom content to which the user requested access to obtain custom search results 540.

Selected ranking parameters associated with the custom content being searched may be obtained (block 1020). The ranking parameters may have been selected by the user that uploaded, or identified, the custom content being searched, as described above with respect to FIG. 9. The ranking parameters may include, but are not limited to, annotations by the user that uploaded or identified custom content 120 that indicate the relative importance or value of different portions of the custom content being searched, usage patterns of users who have accessed the custom content being searched or other custom content not currently being searched, or user feedback provided by other users who have accessed the same custom content and have provided indications of their opinion of the quality of the custom content that they have accessed.

The results of the search of the custom search index(es) may then be ranked (or re-ranked) based on the obtained ranking parameters (block 1025). Custom search engine 520 may use custom content ranking algorithm 170 and the obtained ranking parameters 175 to rank (or re-rank) the results of the search of the custom search index(es). For example, annotations associated with the custom content that corresponds to the searched custom search index(es) may be used by custom content ranking algorithm 170 to rank higher those custom search results with annotations indicating a higher importance than other custom search results with annotations indicating a lower importance.

Figure 13:
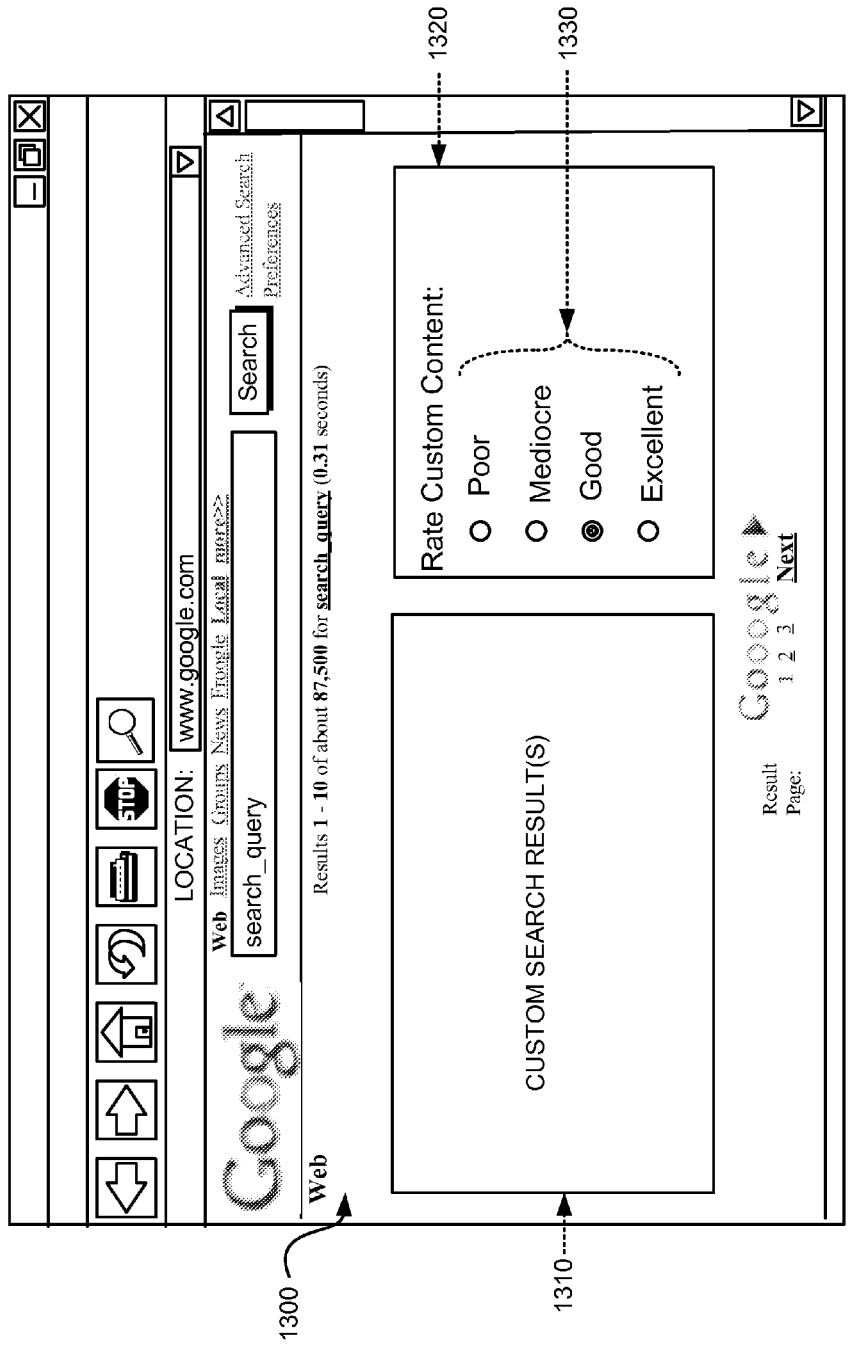
FIG. 13 is an exemplary diagram of a search result document that may permit a searching user to rate custom content provided to the user.

As another example, user feedback provided by other users who have previously searched the same custom content and have provided indications of their opinion of the quality of the custom content returned to them as the result of a search may be used by custom ranking algorithm 170 to rank the custom search results. For example, those custom search results having a more positive user feedback may be ranked higher than other custom search results having less positive user feedback. FIG. 13 illustrates one exemplary manner in which users accessing custom content may provide feedback that can be used in ranking the results of subsequent searches of the custom content. As shown in FIG. 13, a search result document 1500 may be provided to a user searching a specific corpora of custom content that includes custom search results 1310 that match the user's search query. In addition to custom search results 1310, document 1300 may include a custom content rating window 1320 that permits the user to rate the content contained in custom search results 1310. Window 1320 may include several different ratings (e.g., from poor to excellent) that the user may select to rate the content of custom search results 1310.

Figure 14:
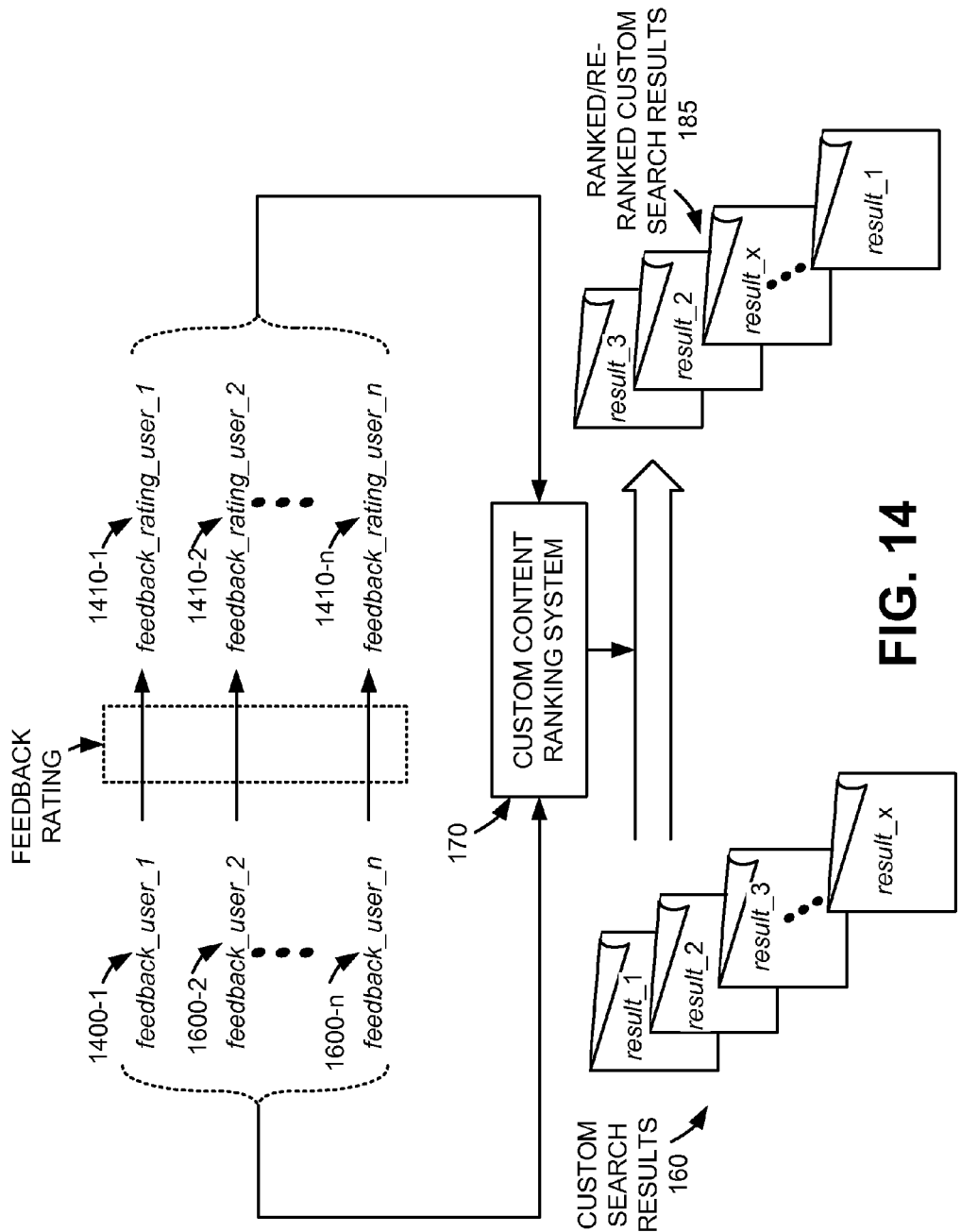
FIG. 14 is an exemplary diagram that graphically illustrates the use of user provided feedback to rank/re-rank custom content search results provided to the user.
Figure 16:
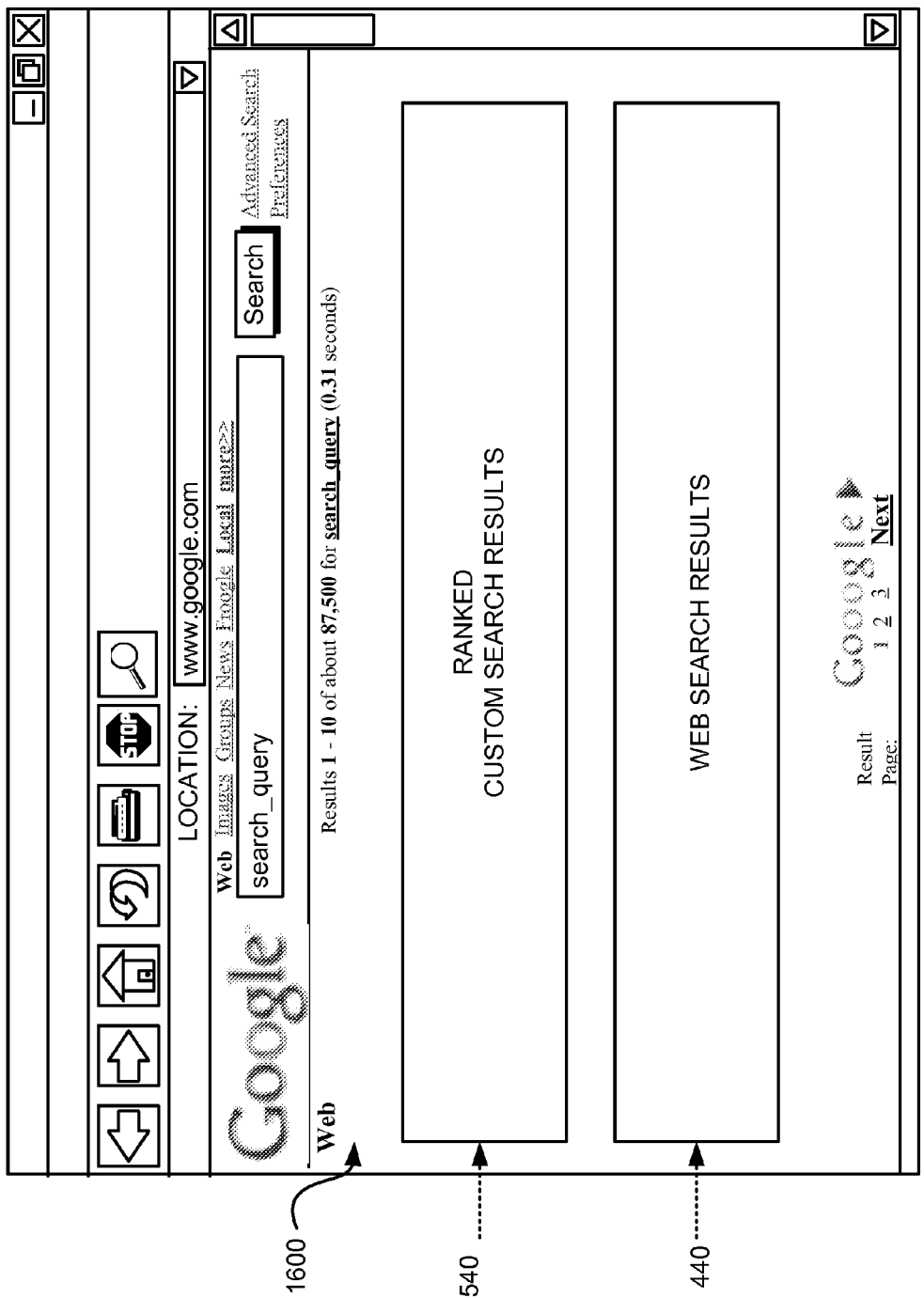
FIG. 16 is an exemplary diagram of a search result document that may provide custom search results and web search results to a user.

FIG. 14 graphically illustrates the use of user feedback in ranking custom content from a specific corpus of custom content. As shown in FIG. 14, user feedback indicators 1400-1 through 1400-n, that rate search results, may have previously been received from users searching a custom search index 130 associated with custom content 120. Each of the user feedback indicators 1400-1 through 1400-n may further be rated. Feedback provided by a first user may be considered to have more weight than feedback provided by a second user. For example, it may be known that the second user consistently provides feedback that is substantially more negative than other users. Feedback provided by this second user, therefore, may be weighted less (i.e., have a lower feedback rating) than feedback provided by the first user. User feedback indicators 1400-1 through 1400-n, possibly in combination with user feedback ratings 1410-1 through 1410-n, may be used by custom content ranking algorithm 170 to rank search results obtained by searching the custom content associated with the user feedback. As shown in FIG. 16, custom search engine 520 (not shown) may obtain custom search results 160 by searching custom search index 130. Custom content ranking algorithm 170 may then rank (or re-rank if custom search results 160 have already been initially ranked) custom search results 160 in an order that is based on user feedback indicators 1400-1 through 1400-n, possibly in combination with user feedback ratings 1410-1 through 1410-n. Thus, results of custom search results 160 that have better user feedback ratings may be ranked higher than other results of custom search results 160 that have worse user feedback ratings.

Figure 15:
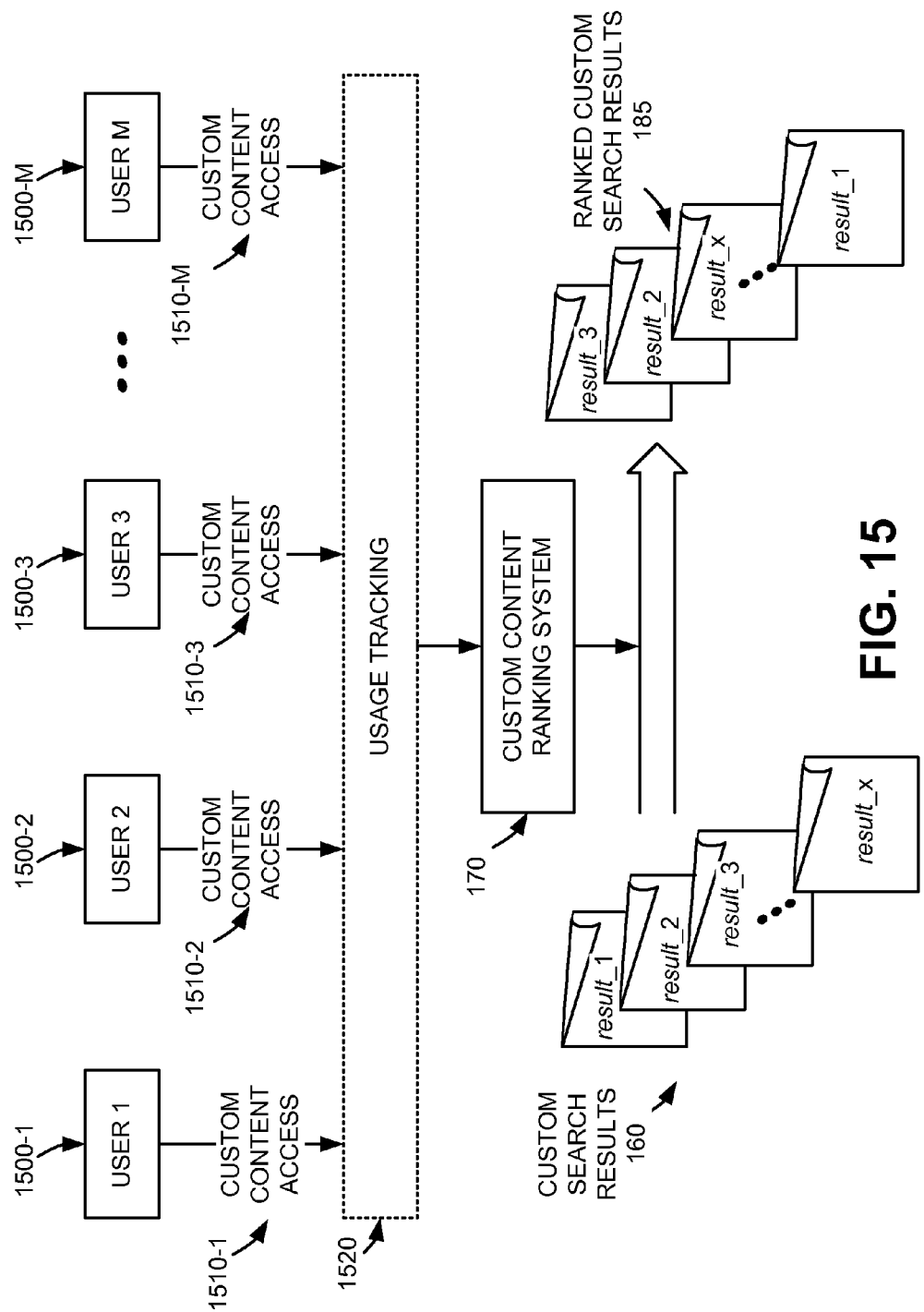
FIG. 15 is an exemplary diagram that graphically illustrates ranking/re-ranking of custom content search results using custom content usage tracking data.

As a further example, usage patterns associated with users who have accessed the custom content being searched, or with other custom content not being searched, may be used by custom ranking algorithm 170 to rank the custom search results. For example, portions of custom content selected and accessed more frequently from the custom search results may be ranked higher than other portions of custom content selected and accessed less frequently. FIG. 15 graphically illustrates ranking of custom search results based on usage patterns. As shown in FIG. 15, multiple users 1500-1 through 1500-M may access respective custom content 1510-1 through 1510-M. The accessed custom content may include the same corpus of custom content, or different corpora of custom content (i.e., custom content having different custom search indexes). Subscription tracker 730 may implement usage tracking 1520 to track the usage of each corpora of custom content accessed by a user.

The results of usage tracking 1520 may be used by custom content ranking algorithm 170 to rank (or re-rank) custom search results. As shown in FIG. 15, custom search engine 520 (not shown) may return a set of custom search results 160. Custom content ranking function 170 may, based on usage tracking 1520, rank (or re-rank) custom search results 160 in a rank order to produce ranked custom search results 185.

Ranked results of the search of the custom search index(es) may be provided to the user (block 1030). Data delivery engine/content formatter 530 may format ranked custom search results 540 received from custom search engine 520 and provide the formatted custom search results 540 to a client 205 associated with the authenticated user via network 230.

Web search index 110 may also be searched based on the search query (optional block 1035). Web search engine 420 may search web search index 110, based on the search query, to return web search results 440. The results of the search of web search index 110 may be provided to the user (optional block 1040). Result formatter 350 may combine the formatted custom search results 540 received from data delivery engine/content formatter 530 together with web search results 440 and provide the combined results to a client 205 associated with the authenticated user via network 230. For example, as shown in FIG. 16, ranked custom search results 540 may be provided to the authenticated user via a search result document 1800 along with web search results 440. As depicted in FIG. 16, custom search results 540 may be displayed prominently (e.g., at the top of the search results), or highlighted, with respect to web search results 440.

CONCLUSION

Implementations described herein provide illustration and description, but is not intended to be exhaustive or to limit the invention to the precise form disclosed. Modifications and variations are possible in light of the above teachings, or may be acquired from practice of the invention. For example, while series of acts have been described with regard to FIGS. 8, 10A and 10B, the order of the acts may be modified in other implementations. Further, non-dependent acts may be performed in parallel.

It will be apparent that aspects described herein may be implemented in many different forms of software, firmware, and hardware in the implementations illustrated in the figures. The actual software code or specialized control hardware used to implement these aspects is not limiting of the invention. Thus, the operation and behavior of the aspects have been described without reference to the specific software code, it being understood that software and control hardware could be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
receiving a search query requesting a search of custom content resources, wherein a custom content resource is a resource in a collection of resources exposed to a search engine by a user;
obtaining a custom content search result that a search engine has identified in response to the search query using a custom search index generated from the collection of custom content resources exposed to the search engine by the user, the custom content search result identifying a custom content resource in the collection of resources exposed to the search engine by the user;
obtaining an indication of relative importance for the custom content resource identified by the custom content search result, the indication of relative importance being a measure of importance of the custom content resource assigned by the user that exposed the collection of resources, including the custom content resource, to the search engine, the indication of relative importance indicating a measure of importance of the custom content resource relative to other resources in the collection of resources exposed to the search engine by the user;
determining a score for the custom content search result based on one or more user-specified ranking parameters, the one or more user-specified ranking parameters including the indication of relative importance assigned by the user that exposed the collection of resources, including the custom content resource identified by the custom content search result, to the search engine; and
ranking the custom content search result with one or more other search results using the determined score.

2. The method of claim 1, wherein ranking the custom content search result with one or more other search results using the determined score comprises ranking the custom content search result relative to a web search result, the web search result identifying a web resource that was not exposed to the search engine by the user.

3. The method of claim 1, wherein access to the custom content resource identified by the custom content search result is based on user authentication.

4. The method of claim 1, wherein the one or more user-specified ranking parameters include an indication of relative value of the custom content resource.

5. A computer-implemented method comprising:
receiving a search query requesting a search of custom content resources, wherein a custom content resource is a resource in a collection of resources exposed to a search engine by a user;
obtaining a custom content search result that a search engine has identified in response to the search query using a custom search index generated from the collection of custom content resources exposed to the search engine by the user, the custom content search result identifying a custom content resource in the collection of resources exposed to the search engine by the user;
obtaining an indication of relative quality for the custom content resource identified by the custom content search result, the indication of relative quality being a measure of quality of the custom content resource assigned by the user that exposed the collection of resources, including the custom content resource, to the search engine, the indication of relative quality indicating a measure of quality of the custom content resource relative to other resources in the collection of resources exposed to the search engine by the user;
determining a score for the custom content search result based on one or more user-specified ranking parameters, the one or more user-specified ranking parameters including the indication of relative quality assigned by the user that exposed the collection of resources, including the custom content resource identified by the custom content search result, to the search engine; and
ranking the custom content search result with one or more other search results using the determined score.

6. The method of claim 5, wherein the one or more user-specified ranking parameters include an indication of relative value of the custom content resource.

7. The method of claim 5, wherein ranking the custom content search result with one or more other search results using the determined score comprises ranking the custom content search result relative to a web search result, the web search result identifying a web resource that was not exposed to the search engine by the user.

8. The method of claim 5, wherein access to the custom content resource identified by the custom content search result is based on user authentication.

9. The method of claim 5, wherein the user-specified indication of relative quality for the custom content resource was received after one or more users were presented with a custom content search result provided in response to a query.

10. The method of claim 5, comprising:
providing the custom content search result and the one or more other search results in a search results page that includes a content rating window that permits a second user to provide an indication of relative quality for the custom content resource; and
receiving, from the second user, a second user-specified indication of relative quality for the custom content resource.

11. The method of claim 5, wherein determining a score for the custom content search result based on the one or more user-specified ranking parameters including the user-specified indication of relative quality includes determining the score based on a user feedback weight that is particular to a user that provided the user-specified indication of relative quality for the custom content resource.

12. A system comprising:
one or more computers and one or more storage devices storing instructions that are operable, when executed by the one or more computers, to cause the one or more computers to perform operations comprising:
receiving a search query requesting a search of custom content resources, wherein a custom content resource is a resource in a collection of resources exposed to a search engine by a user;
obtaining a custom content search result that a search engine has identified in response to the search query using a custom search index generated from the collection of custom content resources exposed to the search engine by the user, the custom content search result identifying a custom content resource in the collection of resources exposed to the search engine by the user;
obtaining an indication of relative quality for the custom content resource identified by the custom content search result, the indication of relative quality being a measure of quality of the custom content resource assigned by the user that exposed the collection of resources, including the custom content resource, to the search engine, the indication of relative quality indicating a measure of quality of the custom content resource relative to other resources in the collection of resources exposed to the search engine by the user;
determining a score for the custom content search result based on one or more user-specified ranking parameters, the one or more user-specified ranking parameter including the indication of relative quality assigned by the user that exposed the collection of resources, including the custom content resource identified by the custom content search result, to the search engine; and
ranking the custom content search result with one or more other search results using the determined score.

13. The system of claim 12, wherein the one or more user-specified ranking parameters include an indication of relative value of the custom content resource.

14. The system of claim 12, wherein ranking the custom content search result with one or more other search results using the determined score comprises ranking the custom content search result relative to a web search result, the web search result identifying a web resource that was not exposed to the search engine by the user.

15. The system of claim 12, wherein access to the custom content resource identified by the custom content search result is based on user authentication.

16. The system of claim 12, wherein the user-specified indication of relative quality for the custom content resource was received after one or more users were presented with a custom content search result provided in response to a query.

17. The system of claim 12, wherein the operations comprise:
providing the custom content search result and the one or more other search results in a search results page that includes a content rating window that permits a second user to provide an indication of relative quality for the custom content resource; and
receiving, from the second user, a second user-specified indication of relative quality for the custom content resource.

18. The system of claim 12, wherein determining a score for the custom content search result based on the one or more user-specified ranking parameters including the user-specified indication of relative quality includes determining the score based on a user feedback weight that is particular to a user that provided the user-specified indication of relative quality for the custom content resource.

19. A non-transitory computer-readable medium storing software comprising instructions executable by one or more computers which, upon such execution, cause the one or more computers to perform operations comprising:

receiving a search query requesting a search of custom content resources, wherein a custom content resource is a resource in a collection of resources exposed to a search engine by a user;

obtaining a custom content search result that a search engine has identified in response to the search query using a custom search index generated from the collection of custom content resources exposed to the search engine by the user, the custom content search result identifying a custom content resource in the collection of resources exposed to the search engine by the user;

obtaining an indication of relative quality for the custom content resource identified by the custom content search result, the indication of relative quality being a measure of quality of the custom content resource assigned by the user that exposed the collection of resources, including the custom content resource, to the search engine, the indication of relative quality indicating a measure of quality of the custom content resource relative to other resources in the collection of resources exposed to the search engine by the user;

determining a score for the custom content search result based on one or more user-specified ranking parameters, the one or more user-specified ranking parameters including the indication of relative quality assigned by the user that exposed the collection of resources, including the custom content resource identified by the custom content search result, to the search engine; and ranking the custom content search result with one or more other search results using the determined score.

20. The computer-readable medium of claim 19, wherein the one or more user-specified ranking parameters include an indication of relative value of the custom content resource.

21. The computer-readable medium of claim 19, wherein ranking the custom content search result with one or more other search results using the determined score comprises ranking the custom content search result relative to a web search result, the web search result identifying a web resource that was not exposed to the search engine by the user.

22. The computer-readable medium of claim 19, wherein access to the custom content resource identified by the custom content search result is based on user authentication.

23. The computer-readable medium of claim 19, wherein the user-specified indication of relative quality for the custom content resource was received after one or more users were presented with a custom content search result provided in response to a query.

24. The computer-readable medium of claim 19, wherein the operations comprise:

providing the custom content search result and the one or more other search results in a search results page that includes a content rating window that permits a second user to provide an indication of relative quality for the custom content resource; and receiving, from the second user, a second user-specified indication of relative quality for the custom content resource.

25. The computer-readable medium of claim 19, wherein determining a score for the custom content search result based on the one or more user-specified ranking parameters including the user-specified indication of relative quality includes determining the score based on a user feedback weight that is particular to a user that provided the user-specified indication of relative quality for the custom content resource.

26. The method of claim 2, wherein the web search result has an associated second score, the second score being based on one or more other ranking parameters other than the one or more user-specified ranking parameters.

27. The method of claim 1, wherein obtaining an indication of relative importance for the custom content resource identified by the custom content search result comprises:

identifying an annotation associated with a portion of the custom content resources that includes multiple custom content resources including the custom content resource identified by the custom content search result, wherein the annotation indicates an importance of each of the multiple custom content resources in the portion of the custom content resources relative to other custom content resources in one or more other portions of the custom content resources.

28. The method of claim 7, wherein the web search result has an associated second score, the second score being based on one or more other ranking parameters other than the one or more user-specified ranking parameters.

29. The system of claim 14, wherein the web search result has an associated second score, the second score being based on one or more other ranking parameters other than the one or more user-specified ranking parameters.

30. The computer-readable medium of claim 21, wherein the web search result has an associated second score, the second score being based on one or more other ranking parameters other than the one or more user-specified ranking parameters.

* * * * *